US012586872B2

(12) United States Patent
Chai et al.

(10) Patent No.: US 12,586,872 B2
(45) Date of Patent: Mar. 24, 2026

(54) ELECTRODE ASSEMBLY, BATTERY CELL, BATTERY AND ELECTRIC DEVICE

(71) Applicant: CONTEMPORARY AMPEREX TECHNOLOGY (HONG KONG) LIMITED, Hong Kong (CN)

(72) Inventors: Zhisheng Chai, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/055,712

(22) Filed: Feb. 18, 2025

(65) Prior Publication Data

US 2025/0192386 A1    Jun. 12, 2025

Related U.S. Application Data

(63) Continuation of application No. PCT/CN2023/075460, filed on Feb. 10, 2023.

(51) Int. Cl.
H01M 50/538        (2021.01)
H01M 10/04          (2006.01)
(Continued)

(52) U.S. Cl.
CPC ..... H01M 50/533 (2021.01); H01M 10/0431 (2013.01); H01M 50/538 (2021.01); *H01M 2220/20* (2013.01)

(58) Field of Classification Search
None
See application file for complete search history.

(56) References Cited

U.S. PATENT DOCUMENTS 4,049,882 A * 9/1977 Beatty ................. H01M 50/538
429/94
2005/0277019 A1    12/2005 Riley et al.
(Continued)

FOREIGN PATENT DOCUMENTS

CN        206065157 U     4/2017
CN        207009552 U     2/2018
(Continued)

OTHER PUBLICATIONS

International Search Report and Written Opinion mailed on Oct. 29, 2023, received for PCT Application PCT/CN2023/075460, filed on Feb. 10, 2023, 13 pages including English Translation.
(Continued)

*Primary Examiner* — Yoshitoshi Takeuchi
(74) *Attorney, Agent, or Firm* — XSENSUS LLP

(57) ABSTRACT

An electrode assembly, a battery cell, a battery, and an electric device are provided. The electrode assembly includes two electrode sheets having opposite polarities and a separator used for separating the two electrode sheets, the two electrode sheets and the separator being wound in a winding direction to form a main body and two tabs. The tabs and the main body are arranged in a first direction; each tab comprises a plurality of tab portions arranged at intervals in the winding direction; the tab portions are bent relative to the first direction; at least parts of the plurality of tab portions are stacked in the first direction; and a protrusion is formed on at least one side of each tab portion in the thickness direction thereof.

19 Claims, 11 Drawing Sheets

(51) Int. Cl.
    *H01M 50/533*      (2021.01)
    *H01M 50/536*      (2021.01)

(56)             References Cited

U.S. PATENT DOCUMENTS

| | | | | |
|---|---|---|---|---|
| 2020/0343520 A1* | 10/2020 | Jeong | .................. | H01M 50/533 |
| 2022/0271403 A1* | 8/2022 | Lim | .................... | H01M 50/545 |
| 2022/0384918 A1* | 12/2022 | Xu | ....................... | H01M 50/213 |
| 2023/0352743 A1* | 11/2023 | Ni | .................... | H01M 10/0431 |
| 2023/0387513 A1* | 11/2023 | Hwangbo | ........... | H01M 50/167 |
| 2024/0170712 A1* | 5/2024 | Subramanian | ...... | H01M 50/533 |

FOREIGN PATENT DOCUMENTS

| | | | |
|---|---|---|---|
| CN | 115000345 A | 9/2022 |
| CN | 217740571 U | 11/2022 |
| CN | 115548464 A | 12/2022 |
| JP | 2014-017053 A | 1/2014 |
| WO | 2022/233050 A1 | 11/2022 |

OTHER PUBLICATIONS

Office Action issued Nov. 27, 2025 in Chinese Patent Application No. 202380044182.X with English translation thereof.
Extended European Search Report issued Feb. 10, 2026 in European Patent Application No. 23920516.4.

\* cited by examiner

1000

100

22

221

221

222

221

222

222

221

221

22121

22121

22121

22121

22121

22121

ELECTRODE ASSEMBLY, BATTERY CELL, BATTERY AND ELECTRIC DEVICE

CROSS-REFERENCE TO RELATED APPLICATION

This application is a continuation of international application No. PCT/CN2023/075460, filed on Feb. 10, 2023, which is incorporated herein by reference in its entirety.

TECHNICAL FIELD

The present application relates to the field of battery technology, and specifically, to an electrode assembly, a battery cell, a battery, and an electric device.

BACKGROUND ART

In recent years, new energy vehicles have developed with a great leap. In the field of electric vehicles, power batteries play an irreplaceable and important role as power sources of the electric vehicles. With the vigorous promotion of new energy vehicles, the demand for power battery products is increasing. In the above, the battery includes battery cell(s), and an electrode assembly is provided in the shell of the battery cell. The inputting or outputting of electric energy for the battery cell can be achieved by connecting the electrode assembly and the shell. However, the phenomenon that the electrode assembly is damaged often occurs during production and assembly of the battery cell, resulting in poor production quality of battery cells, which is not conducive to improving the product qualification rate of battery cells.

SUMMARY

Embodiments of the present application provides an electrode assembly, a battery cell, a battery, and an electric device, which can effectively improve the production quality of the battery cell.

In a first aspect, embodiments of the present application provide an electrode assembly, including two electrode sheets with opposite polarities and a separation member for separating the two electrode sheets, where the two electrode sheets and the separation member are wound in a winding direction to form a main body and two tabs; where the tabs and the main body are provided in the first direction, the tabs each include a plurality of tab portions provided at intervals in the winding direction, the tab portions are each provided bent relative to the first direction, at least some of the plurality of tab portions are stacked in the first direction, and at least one protrusion is provided on at least one side of each of the tab portions in a thickness direction thereof.

In the above technical solution, two tabs with opposite polarities and a separation member are wound in a winding direction to form an electrode assembly of a wound structure, so that the electrode assembly has a main body and two tabs, and the tabs and the main body are provided in a first direction. In the above, the tab is provided with a plurality of tab portions arranged at intervals in the winding direction, and the tab portions are each provided bent relative to the first direction, so that at least some of the plurality of tab portions of the tab can be stacked in the first direction, and at least one protrusion is provided on at least one side of the tab portion of the tab, to increase the thickness of the tab portions stacked together and alleviate the phenomenon of small local thickness occurring after the plurality of tab portions of the tab are stacked, thereby improving the production quality of the tab, reducing the risk of the tab being welded through during subsequent assembly and processing, and further facilitating reducing the phenomenon of damage to the electrode assembly, and facilitating improving the connection stability and assembly quality between the electrode assembly and other components of the battery cell, so as to improve the production quality and use stability of the battery cell having such electrode assembly.

In some embodiments, in the thickness direction of the tab portion, a plurality of protrusions are formed on at least one side of the tab portion.

In the above technical solution, by providing the plurality of protrusions on at least one side of the tab portion, the tab portion is bent relative to the first direction and the plurality of tab portions are stacked in the first direction, so that the region with an cavity between two tab portions stacked and adjacent to each other can be effectively increased, which is conducive to further improving the overall thickness of the tab in the first direction, and can improve the uniformity of the thickness of the tab, thereby further alleviating the phenomenon that the tab is welded through during the subsequent assembly and processing.

In some embodiments, in the thickness direction of the tab portion, a projection area of the tab portion is $S_1$, and the sum of the projection areas of the plurality of protrusions on the tab portion is $S_2$, satisfying $S_2/S_1 \geq 0.5$.

In the above technical solution, by setting the sum of the projection areas of the multiple protrusions on the tab portion in the thickness direction of the tab portion to be greater than or equal to a half of the projection area of the tab portion in the thickness direction of the tab portion, that is, the area occupied by the plurality of protrusions on the tab portion is half or more of that of the tab portion, so that the tab portion has sufficient region for providing the protrusions, so as to enable the tab to have sufficient thickness after the plurality of tab portions of the tab are stacked in the first direction, and effectively improve the uniformity of the thickness of the tab to reduce the risk of the tab being welded through during the subsequent assembly.

In some embodiments, the tab portion includes a main body region that does not overlap with the projection of the protrusion in the thickness direction of the tab portion, and the protrusion protrudes from the main body region in the thickness direction of the tab portion; and in the thickness direction of the tab portion, the maximum dimension of the tab portion is $D_1$, and the thickness of the main body region is $D_2$, satisfying $2 \leq D_1/D_2 \leq 8$.

In the above technical solution, the tab portion has a main body region not overlapping with the projection of the protrusion in the thickness direction of the tab portion, and the protrusion protrudes from the main body region in the thickness direction of the tab portion, that is, the main body region of the tab portion is the region of the tab portion not provided with the protrusion. By setting the maximum dimension of the tab portion in the thickness direction of the tab portion to be 2 to 8 times the thickness of the main body region, that is, the maximum thickness of the tab portion provided with the protrusion is 2 to 8 times the thickness of the main body region of the tab portion, so as to effectively increase, after the tab portions are bent relative to the first direction, the thickness of the plurality of tab portions of the tab stacked in the first direction to realize increase in the thickness of the tab and further effectively alleviate the phenomenon of the tab being welded through during the subsequent assembly.

In some embodiments, the tab portion is provided with a plurality of rows of protrusions, and each row of protrusions includes a plurality of the protrusions provided at intervals.

In the above technical solution, the tab portion is provided with the plurality of rows of protrusions and each row of protrusions includes the plurality of protrusions provided at intervals, to make the plurality of protrusions on the tab portion provided in an array, so that the region with an cavity between two tab portions stacked and adjacent to each other can be effectively increased after the plurality of tab portions of the tab are stacked in the first direction, which is conducive to further improving the overall thickness of the tab in the first direction, and can effectively improve the uniformity of the thickness of the tab to reduce the phenomenon that the tab is welded through during the subsequent assembly.

In some embodiments, the maximum dimension of the protrusion in a direction perpendicular to the thickness direction of the tab portion is $W_1$, satisfying 0.3 mm≤$W_1$≤2 mm.

In the above technical solution, the maximum dimension of the protrusion in a direction perpendicular to the thickness direction of the tab portion is set to be 0.3 mm to 3 mm, that is, the maximum dimension of the protrusion in its radial direction is 0.3 mm to 3 mm, which on the one hand, alleviates the phenomenon of excessive processing difficulty caused by too small dimension of the protrusion to reduce the processing difficulty of the tab portion, and on the other hand, alleviates the phenomenon that the number of the plurality of protrusions on the tab portion is limited due to too large dimension of the protrusion.

In some embodiments, the tab portion is provided with a plurality of protrusions arranged at intervals, and two ends of each protrusion extend in a direction perpendicular to an arrangement direction of the plurality of protrusions, to two ends of the tab portion respectively.

In the above technical solution, a plurality of protrusions are formed on the tab portion at intervals, and two ends of each protrusion extend to two ends of the tab portion, that is, the protrusions are strip-shaped structures provided on the tab portion, so as to realize a structure in which a plurality of protrusions are provided on the tab portion. The use of such structure is conducive to reducing the difficulty of providing the protrusions on the tab portion, so as to improve the processing efficiency of the tab portion.

In some embodiments, in the arrangement direction of the plurality of protrusions, the width of the protrusion is $W_2$, satisfying 0.3 mm≤$W_2$≤2 mm.

In the above technical solution, the width of the protrusion in the arrangement direction of the plurality of protrusions is set to be 0.3 mm to 3 mm, that is, the dimension of the protrusion in the direction perpendicular to the extension direction of the protrusion is 0.3 mm to 3 mm, which on the one hand, alleviates the phenomenon of excessive processing difficulty caused by too small width of the protrusion to reduce the processing difficulty of the tab portion, and on the other hand, alleviates the phenomenon that the number of the plurality of protrusions on the tab portion is limited due to too large width of the protrusion.

In some embodiments, in the thickness direction of the tab portion, the tab portion includes a plurality of foils stacked, each foil has one side provided with convex portions and the other side provided with concave portions at positions corresponding to the convex portions, and in two adjacent foils, the convex portions of one foil are accommodated in the concave portions of the other foil, where in the thickness direction of the tab portion, the convex portions located on one side of the tab portion are the protrusions.

In the above technical solution, the tab portion is provided as a structure in which multiple foils are stacked, and convex portions are formed on one side of the foil and concave portions are formed on the other side, so that after the multiple foils are stacked, the convex portions and concave portions of two adjacent foils may be embedded in each other, to realize that protrusions are formed at one side of the tab portion in the thickness direction of the tab portion. The tab portion adopting such structure can effectively increase the thickness and structural strength of the tab portion itself, so that after the multiple tab portions of the tab are stacked in the first direction, the overall thickness and structural strength of the tab can be further increased, so as to further reduce the risk of the tab being welded through during the subsequent assembly.

In some embodiments, the plurality of foils are connected by welding to form the convex portions and concave portions on the foils.

In the above technical solution, the plurality of foils stacked are connected by means of welding, and convex portions and concave portions are formed by means of welding at the positions where the plurality of foils are welded to each other, which, on the one hand, facilitates improving the connection strength and connection stability between the plurality of foils, and on the other hand, facilitates reducing the processing difficulty of forming concave portions and convex portions on the foil, so as to optimize the production takt of the electrode sheet and thereby effectively improve the production efficiency of the electrode sheet.

In some embodiments, the electrode sheet includes a body part, a plurality of the tab portions are connected to the body part, the body parts of the two electrode sheets and the separation member are wound in the winding direction to form the main body, the body part includes a substrate and an active material layer provided on at least one side of the substrate; the plurality of foils include a first foil and a second foil which are stacked, the first foil is connected to one end of the substrate in the first direction and is integrally formed with the substrate, and the second foil is provided separated from the substrate.

In the above technical solution, the multiple foils include a first foil that is integrally formed with the substrate of the body part of the electrode sheet. In actual production, a region of the substrate provided with no active material layer may be reserved, so that the first foil may be provided on the region, and then the second foil(s) may be stacked on one side of the first foil, so that the first foil may provide a connection support point for the second foil(s), so as to achieve an increase in the thickness and structural strength of the tab portion. An electrode sheet adopting such structure can effectively reduce the processing difficulty of connecting the tab portion to the substrate, facilitating improving the production efficiency of the electrode assembly.

In some embodiments, the substrate includes a coating region and a spacing region, the coating region and the spacing region are arranged in the first direction, the active material layer is disposed in the coating region, and the spacing region connects the coating region and the first foil.

In the above technical solution, the substrate is provided with the coating region coated with an active material layer and the spacing region not coated with an active material layer, so that the first foil of the tab portion may be connected to the coating region through the spacing region to achieve that the tab portion and the active material layer are spacedly provided in the first direction. On the one hand, the electrode assembly adopting this structure can isolate through the spacing region the stress generated during the bending process of the tab portion relative to the first direction, so as to reduce the risk of occurrence of fracture of the active material layer provided on the coating region. On the other hand, in the subsequent process of welding the tab to other components, the influence on the active material layer during welding process can be reduced, thereby alleviating the phenomenon of damage to the active material layer and further facilitating improving the production quality of the electrode assembly.

In some embodiments, in the thickness direction of the tab portion, the thickness of the first foil is $D_3$ and the thickness of the second foil is $D_4$, satisfying $0.5 \le D_3/D_4 \le 2$.

In the above technical solution, the thickness of the first foil is set to be 0.5 to 2 times the thickness of the second foil, that is, the thickness of the first foil is 0.5 to 2 times the thickness of the second foil, so as to alleviate the phenomenon of too large assembling difficulty of connecting the first foil and the second foil to each other caused by too large difference between the thickness of the first foil and the thickness of the second foil, and thereby reduce the difficulty of processing the tab portion of this structure. In addition, on the one hand, it can alleviate the phenomenon that the second foil is damaged during the mutual welding process when the thickness of the first foil is too large compared with the thickness of the second foil; and on the other hand, it can alleviate the phenomenon that the first foil is damaged during the mutual welding process when the thickness of the second foil is too large compared with the thickness of the first foil.

In some embodiments, in the direction perpendicular to the thickness direction of the tab portion, the end of the second foil close to the substrate does not extend beyond the end of the first foil connected to the substrate.

In the above technical solution, the second foil is provided not extending beyond the end of the first foil connected to the substrate in the direction perpendicular to the thickness direction of the tab portion, so as to effectively alleviate the interference effect between the second foil and the active material layer provided on one side of the substrate, thereby reducing the risk of the active material layer being damaged by the second foil.

In some embodiments, in the direction perpendicular to the thickness direction of the tab portion, the distance between the end of the first foil away from the substrate and the end of the second foil away from the substrate close to the substrate is L, satisfying $L \le 2$ mm.

In the above technical solution, the spacing between the end of the first foil away from the substrate and the end of the second foil away from the substrate in the direction perpendicular to the thickness direction of the tab portion is set to be less than or equal to 2 mm, that is, the dimension of the end of the first foil away from the substrate extending beyond the end of the second foil away from the substrate is less than or equal to 2 mm, or the dimension of the end of the second foil away from the substrate extending beyond the end of the first foil away from the substrate is less than or equal to 2 mm, thereby alleviating the phenomenon that the first foil exceeds the second foil too much or the second foil exceeds the first foil too much due to too large length of the first foil or the second foil to cause that the tab portion is too long or invertedly inserted into the electrode assembly, thereby facilitating improving the production quality and use reliability of the electrode assembly.

In some embodiments, the first foil and the second foil are of the same material.

In the above technical solution, the first foil and the second foil are provided to be of the same material, which on the one hand, achieves stable polarity of the tab portion, and on the other hand, reduces the processing difficulty of connecting the first foil and the second foil to each other.

In some embodiments, the electrode sheet includes a body part, a plurality of the tab portions are connected to the end of the body part in the first direction, and the body parts of two electrode sheets and the separation member are wound in the winding direction to form the main body, where the body part includes a substrate and an active material layer provided on at least one side of the substrate, the substrate includes a coating region and a spacing region, the coating region and the spacing region are arranged in the first direction, the active substrate layer is provided on the coating region, and the spacing region is connected to the coating region and the tab portion.

In the above technical solution, the substrate is provided with the coating region coated with an active material layer and the spacing region not coated with an active material layer, so that the tab portion may be connected to the coating region through the spacing region to achieve that the tab portion and the active material layer are spacedly provided in the first direction. On the one hand, the electrode assembly adopting this structure can isolate through the spacing region the stress generated during the bending process of the tab portion relative to the first direction, so as to reduce the risk of occurrence of fracture of the active material layer provided on the coating region. On the other hand, in the subsequent process of welding the tab to other components, the influence on the active material layer during welding process can be reduced, thereby alleviating the phenomenon of damage to the active material layer and further facilitating improving the production quality of the electrode assembly.

In some embodiments, the tab portion is integrally formed with the spacing region.

In the above technical solution, the tab portion is provided as a structure integrally formed with the spacing region of the substrate, enabling the tab portion to be a part of the substrate in the actual production process, such that after reserving a region on the substrate not provided with the active material layer, the tab portion may be provided on the region to reduce the processing difficulty of connecting the tab portion to the substrate and facilitate improving the production efficiency of the electrode assembly.

In some embodiments, in the thickness direction of the tab portion, grooves are formed on one side of the tab portion away from the protrusions and at positions corresponding to the protrusions.

In the above technical solution, grooves are provided on the side of the tab portion away from the protrusions and at the positions corresponding to the protrusions, so that for the tab portion of this structure, it is realized that the protrusions are formed on the tab portion by a process such as stamping or rolling, which on the one hand, facilitates reducing the processing difficulty of the tab portion and improving the processing efficiency of the tab portion, and on the other hand, has no need to provide protrusions on one side of the tab portion by adding materials, facilitates reducing the production cost of the tab portion and reducing the weight of the tab portion.

In some embodiments, in the first direction, in two adjacent tab portions, the protrusion of one tab portion is staggered with the groove of the other tab portion.

In the above technical solution, in two adjacent tab portions in the first direction, the protrusion of one tab portion and the groove of the other tab portion are provided as structures staggered with each other, so as to effectively alleviate the phenomenon that the protrusion and the groove overlap and then offset each other, to make the tab have sufficient thickness in the first direction, and further facilitate reducing the risk of the tab of the electrode assembly being welded through during the subsequent assembly.

In some embodiments, in the first direction, the thickness of the tab is $D_5$, satisfying: 0.2 mm$\leq D_5 \leq$2.5 mm.

In the above technical solution, by setting the thickness of the tab in the first direction to be 0.2 mm to 2.5 mm, on the one hand, the risk of the tab being welded through due to the too small thickness of the tab can be alleviated, so as to reduce the risk of damage to the electrode assembly during subsequent assembly. On the other hand, the phenomenon of the tab occupying too much space due to the too large thickness of the tab can be alleviated, which is conductive to optimizing the internal space of the battery cell having such electrode assembly to improve the energy density of the battery cell.

In some embodiments, in the first direction, two tabs are provided at two ends of the main body respectively.

In the above technical solution, the two tabs of the electrode assembly are provided at the two ends of the main body in the first direction respectively, that is, the two tabs are respectively formed at the two ends of the electrode assembly in the first direction, so as to facilitate subsequent assembly of the electrode assembly, which is conductive to reducing the difficulty of assembling the battery cell having such electrode assembly and can reduce the phenomenon of interference or mutual contact between the two tabs and thereby facilitate reducing the risk of short circuit of the electrode assembly.

In some embodiments, the main body is cylindrical.

In the above technical solution, the main body of the electrode assembly is provided as a cylindrical structure, so as to facilitate subsequent processing to form a battery cell of a cylindrical structure.

In a second aspect, embodiments of the present application further provide a battery cell, including a shell and the electrode assembly above, where the electrode assembly is accommodated in the shell.

In some embodiments, the battery cell further includes current collecting members, the current collecting members are provided between the shell and tabs in the first direction, and the current collecting members connect the shell and the tabs.

In the above technical solution, by providing the current collecting members in the shell of the battery cell, the shell is connected to the tabs of the electrode assembly through the current collecting members, so as to achieve inputting or outputting of the electric energy for the battery cell. This structure is simple, easy to implement, and is conducive to reducing the difficulty of assembling the tabs and the shell.

In some embodiments, the current collecting member is connected to the tab by welding, and in the first direction, the thickness of the tab is $D_5$, and the thickness of the current collecting member is $D_6$, satisfying: $D_6 \leq 1.5 D_5$.

In the above technical solution, the thickness of the current collecting member in the first direction is set to be less than or equal to 1.5 times the thickness of the tab in the first direction, so as to alleviate the phenomenon that welding power required for welding the current collecting member and the tab is too large due to that the thickness of the current collecting member is too large compared with the thickness of the tab, thereby effectively reducing the risk of the tab being welded through to reduce the phenomenon of damage to the electrode assembly and facilitating improving the production quality of battery cells.

In some embodiments, the current collecting member is connected to the tab by welding and a weld mark is formed, and in the first direction, the weld mark covers the protrusion(s) of at least one of the tab portions.

In the above technical solution, the weld mark formed by welding the current collecting member and the tab to each other is provided to cover the protrusion(s) of at least one tab portion in the first direction, that is, in the first direction, the position where the current collecting member and the tab are welded to each other is provided corresponding to the protrusion(s) of at least one tab portion, so as to make the position where the current collecting member and the tab are welded to each other is located in the region where the tab is thickened by the protrusion, which is conductive to further reducing the risk of the tab being welded through during the assembly.

In a third aspect, embodiments of the present application further provide a battery, including at least one battery cell above.

In a fifth aspect, embodiments of the present application further provide an electric device, including at least one battery above.

BRIEF DESCRIPTION OF DRAWINGS

In order to illustrate the technical solutions of the embodiments of the present application more clearly, the drawings required to be used in the embodiments will be briefly introduced below. It should be understood that the drawings below only show some embodiments of the present application and thus should not be construed as limiting the scope. Those of ordinary skill in the art may also obtain other relevant drawings based on the drawings without paying creative efforts.

Figure 1:
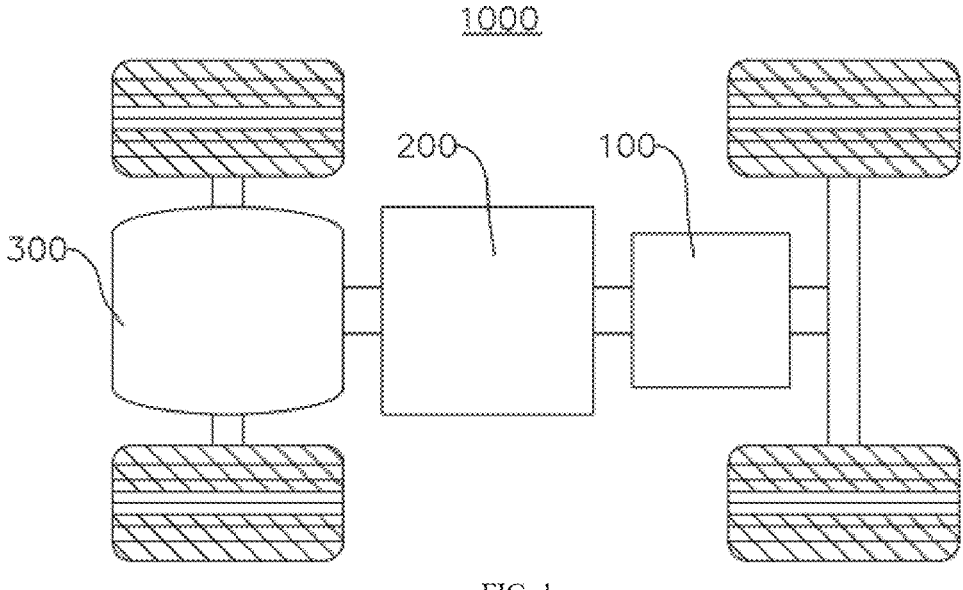
FIG. 1 is a schematic structural diagram of a vehicle provided by some embodiments of the present application.

Reference signs: 1000—vehicle; 100—battery; 10—box; 11—first box body; 12—second box body; 20—battery cell; 21—shell; 211—casing; 2111—opening; 212—end cover; 22—electrode assembly; 221—electrode sheet; 2211—body part; 22111—substrate; 22111*a*—coating region; 22111*b*—spacing region; 22112—active material layer; 2212—tab; 22121—tab portion; 22121*a*—protrusion; 22121*b*—groove; 22121*c*—main body region; 22121*d*—foil; 22121*e*—convex portion; 22121*f*—concave portion; 22121*g*—first foil; 22121*h*—second foil; 222—separation member; 223—main body; 23—current collecting member; 24—weld mark; 200—controller; 300—motor; X—first direction; Y—winding direction; Z—thickness direction of the tab portion.

DETAILED DESCRIPTION OF EMBODIMENTS

In order to make the purposes, technical solutions and advantages of the embodiments of the present application clearer, the technical solutions in the embodiments of the present application will be clearly described below in conjunction with the drawings in the embodiments of the present application. Obviously, the described embodiments are some, not all of the embodiments of the present application. Based on the embodiments in the present application, all other embodiments obtained by those of ordinary skill in the art without paying creative efforts fall within the scope of protection of the present application.

Unless otherwise defined, all technical and scientific terms used in the present application have the same meanings as commonly understood by those skilled in the art of the present application; the terms used in the description of the present application are for the purpose of describing specific examples only and are not intended to limit the present application; the terms "including" and "having" and any variations thereof in the description and claims of the present application and the above description of the drawings are intended to cover non-exclusive inclusion. The terms "first", "second", etc. in the description and claims of the present application or the above-mentioned drawings are used to distinguish different objects, rather than to describe a specific order or priority relationship.

Reference made in the present application to "embodiment/example" means that a particular feature, structure, or characteristic described in connection with the embodiment may be included in at least one embodiment/example of the present application. The phases occurring in various places in the specification do not necessarily all refer to the same embodiment, nor are separate or alternative embodiments mutually exclusive of other embodiments.

In the description of the present application, it should be indicated that unless otherwise clearly specified and limited, technical terms such as "install", "link", "connect" and "attach" should be understood in a broad sense, for example, it may be a fixed connection, or a detachable connection, or an integral connection; it may be a direct connection, or an indirect connection through an intermediary, or it may be an internal communication between two elements. Those of ordinary skill in the art may understand the specific meanings of the above terms in the present application according to specific situations.

The term "and/or" in the present application indicates only an association relationship describing associated objects, meaning that there may be three kinds of relationships. For example, A and/or B may indicate three situations: there is only A, there are both A and B, and there is only B. In addition, the character "/" in the present application generally indicates that the associated objects therebefore and thereafter have an "or" relationship.

In the embodiments of the present application, the same reference signs represent the same components, and for the sake of simplicity, detailed descriptions of the same components in different embodiments are omitted. It should be understood that the thickness, length, width and other dimensions of various components, as well as the overall thickness, length, width and other dimensions of the integrated device, in the embodiments of the present application shown in the drawings are only illustrative and should not constitute any limitation to the present application.

"Multiple/plurality of" appearing in the present application means two or more (including two).

In the embodiment of the present application, the battery cell may be a secondary battery. A secondary battery refers to a battery cell that can be continuously used by charging to activate active materials, after the battery cell is discharged.

The battery cell may be lithium ion battery, sodium ion battery, sodium-lithium ion battery, lithium metal battery, sodium metal battery, lithium-sulfur battery, magnesium ion battery, nickel-hydrogen battery, nickel-cadmium battery, lead storage battery, etc., which is not limited in the embodiments of the present application.

The battery cell generally includes at least one electrode assembly. The electrode assembly includes a positive electrode, a negative electrode and a separation member. During charging and discharging of a battery cell, active ions (such as lithium ions) are inserted and deinserted back and forth between the positive and negative electrodes. The separation member is disposed between the positive electrode and the negative electrode, which can prevent the positive and negative electrodes from short-circuiting and simultaneously allow the active ions to pass therethrough.

In some embodiments, the positive electrode may be a positive electrode sheet which may include a positive current collector and a positive electrode active material disposed on at least one surface of the positive current collector.

As an example, the positive current collector has two surfaces opposite to each other in its thickness direction, and the positive electrode active material is disposed on either or both of the two surfaces of the positive current collector opposite to each other.

As an example, the positive current collector may be a metal foil or a composite current collector. For example, as the metal foil, surface-treated aluminum or stainless steel with silver, stainless steel, copper, aluminum, nickel, carbon electrode, carbon, nickel or titanium or the like may be used. The composite current collector may include a polymer material base layer and a metal layer. The composite current collector may be formed by forming a metal material (aluminum, aluminum alloy, nickel, nickel alloy, titanium, titanium alloy, silver and silver alloy, etc.) on a polymer material substrate (such as a substrate of polypropylene, polyethylene terephthalate, polybutylene terephthalate, polystyrene, polyethylene, etc.).

As an example, the positive electrode active material may include at least one of the following materials: lithium-containing phosphate, lithium transition metal oxide, and their respective modified compounds. However, the present application is not limited to these materials, and other traditional materials that can be used as positive electrode active materials for batteries may also be used. Only one of these positive electrode active materials may be used. Or a combination of two or more of them may be used. In the above, examples of lithium-containing phosphate may include, but are not limited to, at least one of lithium iron phosphate (such as $LiFePO_4$ (also referred to as LFP)), composite material of lithium iron phosphate and carbon, lithium manganese phosphate (such as $LiMnPO_4$), composite material of lithium manganese phosphate and carbon, lithium iron manganese phosphate, and composite material of lithium iron manganese phosphate and carbon.

In some embodiments, the negative electrode may be a negative electrode sheet which may include a negative current collector.

As an example, the negative current collector may be a metal foil, a foam metal, or a composite current collector. For example, as the metal foil, surface-treated aluminum or stainless steel with silver, stainless steel, copper, aluminum, nickel, carbon electrode, carbon, nickel or titanium or the like may be used. The foam metal may be nickel foam, copper foam, aluminum foam, alloy foam, or carbon foam, etc. The composite current collector may include a polymer material base layer and a metal layer. The composite current collector may be formed by forming a metal material (copper, copper alloy, nickel, nickel alloy, titanium, titanium alloy, silver and silver alloy, etc.) on a polymer material substrate (such as a substrate of polypropylene, polyethylene terephthalate, polybutylene terephthalate, polystyrene, polyethylene, etc.).

As an example, the negative electrode sheet may include a negative current collector and a negative electrode active material disposed on at least one surface of the positive current collector.

As an example, the negative current collector has two surfaces opposite to each other in its thickness direction, and the negative electrode active material is disposed on either or both of the two surfaces of the negative current collector opposite to each other.

As an example, the negative electrode active material may be a negative electrode active material for a battery cell well known in the art. As an example, the negative electrode active material may include at least one of the following materials: artificial graphite, natural graphite, soft carbon, hard carbon, silicon-based material, tin-based material, lithium titanate, etc.

In some embodiments, the material of the positive current collector may be aluminum, and the material of the negative current collector may be copper.

In some embodiments, the electrode assembly further includes a separation member, which is disposed between the positive electrode and the negative electrode.

In some embodiments, the separation member is a separator. The present application has no particular limitation on the type of separator, and any well-known porous separator with good chemical stability and mechanical stability may be selected.

As an example, the main material of the separator may be at least one selected from glass fiber, non-woven fabric, polyethylene, polypropylene, polyvinylidene fluoride, and ceramic.

In some embodiments, the separation member is solid electrolyte. The solid electrolyte is arranged between the positive electrode and the negative electrode, and plays the role of transporting ions and isolating the positive electrode from negative electrode.

In some embodiments, the battery cell further includes an electrolyte, which plays a role in conducting ions between the positive electrode and negative electrode. The present application has no specific restrictions on the type of electrolyte, which can be selected according to needs. The electrolyte may be liquid, gelatinous or solid.

In some embodiments, the electrode assembly is in a wound structure. The positive electrode sheet and the negative electrode sheet are wound into the wound structure.

In some embodiments, the electrode assembly is in a laminated structure.

In some embodiments, the shape of the electrode assembly may be cylindrical, flat, or multi-prismatic (polygonal), etc.

In some embodiments, the electrode assembly is provided with tabs which can conduct current out from the electrode assembly. The tabs include a positive tab and a negative tab.

In some embodiments, the battery cell may include a shell. The shell is used to package components such as the electrode assembly and the electrolyte. The shell may be a steel shell, an aluminum shell, a plastic shell (such as polypropylene), a composite metal shell (such as a copper-aluminum composite shell) or an aluminum-plastic film, etc.

As an example, the battery cell may be a cylindrical battery cell, a prismatic battery cell, a soft-pack battery cell or a battery cell of other shapes, the prismatic battery cell includes a square-shell battery cell, a blade-shaped battery cell, a multi-prismatic battery, and the multi-prismatic battery is, for example, a hexagonal battery, etc., which are not specifically limited in the present application.

The battery mentioned in embodiments of the present application refers to a single physical module that includes one or more battery cells to provide higher voltage and capacity.

In some embodiments, the battery may be a battery module. When there are multiple battery cells, the multiple battery cells are arranged and fixed to form a battery module.

In some embodiment, the battery may be a battery pack. The battery pack includes a box and battery cell(s), and the battery cell(s) or the battery module is accommodated in the box.

In some embodiments, the box may be provided as a portion of the chassis structure of the vehicle. For example, a portion of the box may become at least a portion of the floor of the vehicle, or a portion of the box may become at least a portion of the cross beams and the longitudinal beams of the vehicle.

In some embodiments, the battery may be an energy storage device. The energy storage device includes an energy storage container, an energy storage cabinet, etc.

The battery, which has outstanding advantages such as high energy density, small environmental pollution, high power density, long service life, wide application range, and small self-discharge coefficient, is an important part of the development of new energy today. In the above, current collecting members are usually provided in the shell of the battery cell. During the assembly process of the battery cell, the tabs of the electrode assembly need to be welded to the current collecting members and then connected to the shell through the current collecting members to realize inputting or outputting of electrical energy for the battery cell, thereby facilitating the assembly of the battery cell and reducing the difficulty of assembling the battery cell.

For general battery cells, the electrode assembly is usually welded to the current collecting member through the tab to achieve electrical connection between the electrode assembly and the current collecting member, and the tab is usually formed by stacking multiple tab sheets. In order to reduce the difficulty of assembly between the electrode assembly and the current collecting member, especially the electrode assembly of a cylindrical structure, during the production and assembling processes of the battery cell, a flattening process or a smoothing process is usually used to flatten or smooth the multiple tab sheets of the electrode sheet to improve the flatness of the tab, so that the tab is formed at one end of the electrode assembly, facilitating reducing the difficulty of welding between the tab and the current collecting member. However, during the flattening or smoothing of the tab of the existing electrode assembly, it is easy to cause the phenomenon that the tab has too small local thickness and easy to cause the phenomenon that the thickness of the whole tab is small after the multiple tab sheets are closely attached, enabling that the situation of the tab being welded through easily occurs in the process of welding the tab and the current collecting member to each other, resulting in the presence of risk of damage to the electrode assembly and thereby poor production quality of the battery cell, which is not conducive to improving the product qualification rate of the battery cell.

Based on the above considerations, in order to solve the problem of poor production quality of battery cells, embodiments of the present application provide an electrode assembly, including two electrode sheets with opposite polarities and a separation member for separating the two electrode sheets, where the two electrode sheets and the separation member are wound in a winding direction to form a main body and two tabs; where the tabs and the main body are provided in the first direction, the tabs each include a plurality of tab portions provided at intervals in the winding direction, the tab portions are each bent relative to a first direction, at least some of the plurality of tab portions are stacked in the first direction, and at least one protrusion is provided on at least one side of each of the tab portions in a thickness direction thereof.

In the electrode sheet of this structure, two electrode sheets with opposite polarities and a separation member are wound in a winding direction to form an electrode assembly of a wound structure, so that the electrode assembly has a main body and two tabs, and the tabs and the main body are provided in a first direction. In the above, the tab is provided with a plurality of tab portions arranged at intervals in the winding direction, and the tab portions are each bent relative to the first direction, so that at least some of the plurality of tab portions of the tab can be stacked in the first direction, and at least one protrusion is provided on at least one side of the tab portion of the tab, to increase the thickness of the plurality of tab portions stacked together and alleviate the phenomenon of small local thickness occurring after the plurality of tab portions of the tab are stacked, thereby improving the production quality of the tab, reducing the risk of the tab being welded through during subsequent assembly and processing, and further facilitating reducing the phenomenon of damage to the electrode assembly, and facilitating improving the connection stability and assembly quality between the electrode assembly and other components of the battery cell, so as to improve the production quality and use stability of the battery cell having such electrode assembly.

The electrode sheet disclosed in the embodiments of the present application can be used in, but is not limited to, vehicles, ships, aircraft or other electric devices. The power supply system of the electric device, composed of the electrode assembly, battery cell, battery, etc. disclosed in the present application, may be used. In this way, it can effectively alleviate the phenomenon that the tab of the electrode assembly is welded through during the production and assembly of the battery cell, so as to improve the production quality of the battery cell.

Embodiments of the present application provide an electric device using the battery as the power supply. The electric device may be, but not limited to a mobile phone, a panel computer, a notebook computer, an electric toy, an electric tool, an electric power cart, an electric vehicle, a ship, a spacecraft or the like. In the above, the electric toy includes a fixed or mobile electric toy, such as a game console, an electric car toy, an electric ship toy, or an electric aircraft toy. The spacecraft includes an airplane, a rocket, a space shuttle, a spaceship, or the like.

For convenient description, the following embodiments are described by taking a vehicle 1000 as an electric device of one embodiment as example.

Referring to FIG. 1, FIG. 1 is a schematic structural diagram of a vehicle 1000 provided by some embodiments of the present application. The vehicle 1000 may be an oil-fueled vehicle, a gas vehicle, or a new energy vehicle. The new energy vehicle may be a pure electric vehicle, a hybrid electric vehicle, an extended-range vehicle, or the like. A battery 100 is disposed inside the vehicle 1000, and the battery 100 may be disposed at a bottom of the vehicle 1000, disposed at a head of the vehicle 1000, or disposed at a tail of the vehicle 1000. The battery 100 may be used for supplying power to the vehicle 1000. For example, the battery 100 may be used as an operation power supply or a use power supply of the vehicle 1000. The vehicle 1000 may further include a controller 200 and a motor 300. The controller 200 is used for controlling the battery 100 to supply power to the motor 300, for example, for a working power demand of the vehicle 1000 during startup, navigation and running.

In some embodiments of the present application, the battery 100 may be used not only as an operation power supply or a use power supply of the vehicle 1000, but also as a driving power supply of the vehicle 1000 to replace or partially replace fuel or natural gas to provide driving power for the vehicle 1000.

Figure 2:
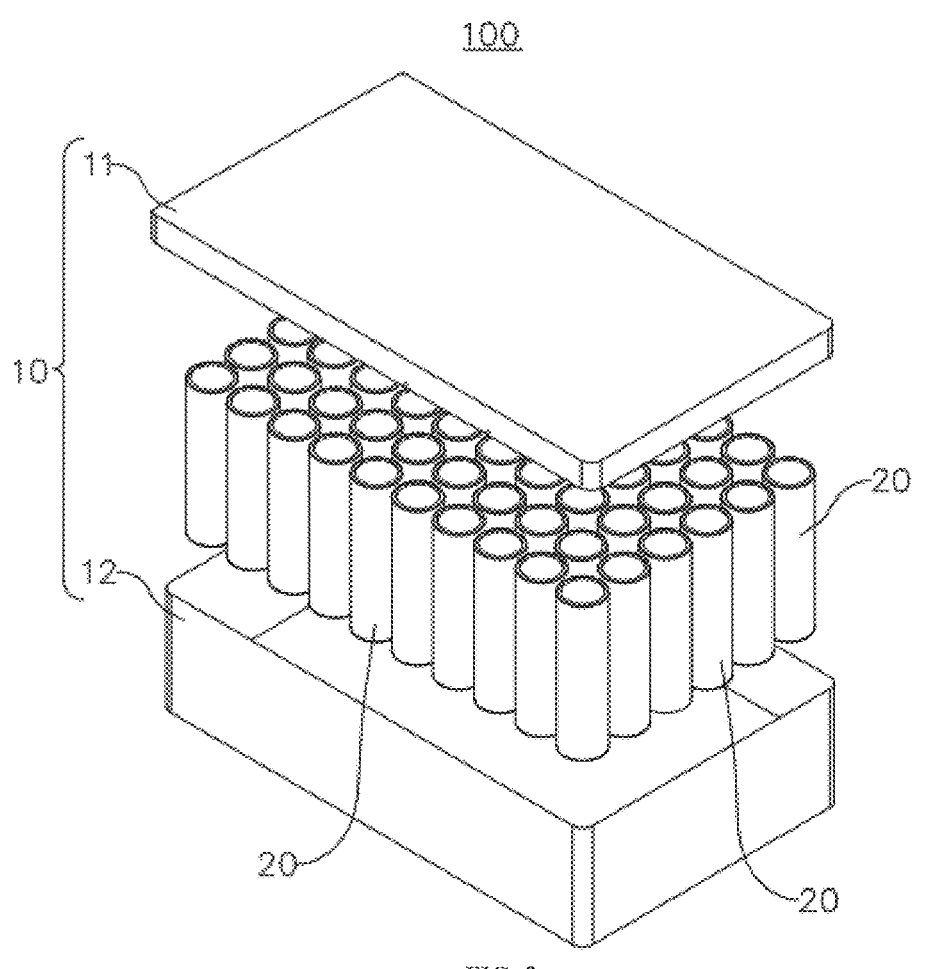
FIG. 2 is a structural exploded view of a battery provided by some embodiments of the present application.

Referring to FIG. 2, FIG. 2 is an exploded view of a battery 100 provided by some embodiments of the present application. The battery 100 may include a box 10 and battery cells 20, and the battery cells 20 are accommodated in the box 10.

In the above, the box 10 is used to provide an assembly space for the battery cells 20, and the box 10 may be in a variety of structures. In some embodiments, the box 10 may include a first box body 11 and a second box body 12. The first box body 11 and the second box body 12 cover each other. The first box body 11 and the second box body 12 jointly define the assembly space for accommodating the battery cells 20. The second box body 12 may be in a hollow structure with one side open, and the first box body 12 may be in a plate-like structure. The first box body 11 covers the open side of the second box body 12, so that the first box body 11 and the second box body 12 jointly define an assembly space; and the first box body 11 and the second box body 12 may also be both in a hollow structure with one side open, and the open side of the first box body 11 covers the open side of the second box body 12. Of course, the box 10 formed by the first box body 11 and the second box body 12 may be in various shapes, such as a cylinder, a cuboid and so on. Exemplarily, in FIG. 2, the box 10 is in the shape of a cuboid.

In the battery 100, there may be one or more battery cells 20 provided in the box 10. If there are multiple battery cells 20 provided in the box 10, the multiple battery cells 20 may be in serial, parallel or hybrid connection with each other. The hybrid connection means that the multiple battery cells 20 are connected with each other both in series and in parallel. The plurality of battery cells 20 may be in serial, parallel or hybrid connection with each other, and then the whole composed of the plurality of battery cells 20 is accommodated in the box 10. Certainly, the battery 100 may be formed in the way that the plurality of battery cells 20 are first in serial or in parallel or in hybrid connection with each other to form battery modules, and then the plurality of battery modules are in serial or in parallel or in hybrid connection with each other to form a whole, and accommodated in the box 10. The battery 100 may further include other structures. For example, the battery 100 may further include a bus component for connecting the multiple battery cells 20, to realize electrical connection between the multiple battery cells 20.

In the above, each battery cell 20 may be a secondary battery or a primary battery; and may also be a lithium-sulfur battery, a sodium-ion battery or a magnesium-ion battery, but the battery cell 20 is not limited thereto. The battery cell 20 may be in a shape of cylinder, flat body, cuboid or in other shape. Exemplarily, in FIG. 2, the battery cell 20 is in a cylinder structure.

Figure 3:
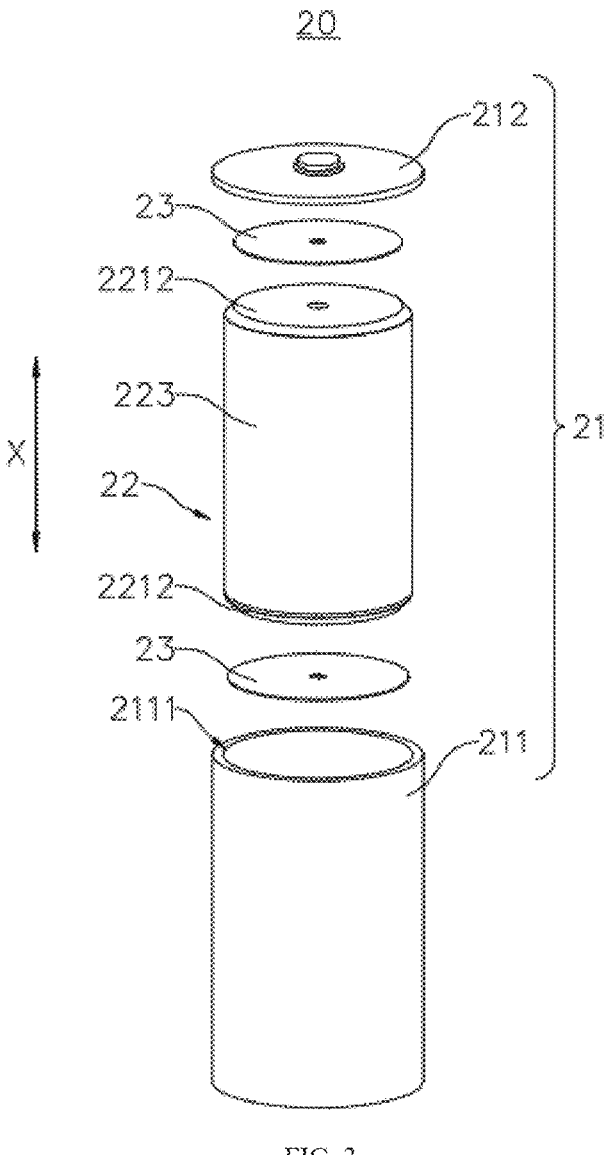
FIG. 3 is a structural exploded view of a battery cell provided by some embodiments of the present application.

Referring to FIG. 2 and further referring to FIG. 3, FIG. 3 is a structural exploded view of a battery cell 20 provided by some embodiments of the present application. The battery cell 20 may include a shell 21 and an electrode assembly 22, and the electrode assembly 22 is accommodated inside the shell 21.

In the above, the shell 21 may be further used to accommodate the electrolyte, e.g., electrolytic solution. The shell 21 may be in various structural form, such as a cylinder, a cuboid or a prism structure and so on. Similarly, the shell 21 may be made of a variety of materials, such as copper, iron, aluminum, steel, aluminum alloy, etc.

In some embodiments, the shell 21 may include a casing 211 and an end cover 212, where an accommodation cavity is formed inside the casing 211, the accommodation cavity has an opening 2111, and the accommodation cavity is used to accommodate the electrode assembly 22, that is, the shell 211 is in a hollow structure with an opening 2111 at one side, and the end cover 212 covers the opening 2111 of the casing 211 and forms a sealed connection to form a sealed space for accommodating the electrode assembly 22 and the electrolyte.

When assembling the battery cell 20, the electrode assembly 22 may be placed in the casing 211 first, followed by filling the electrolyte into the casing 211 and then making the end cover 212 cover the opening 2111 of the casing 211, to complete the assembly of the battery cell 20.

The casing 211 may be in various shapes, such as a cylinder, a cuboid and so on. The shape of the casing 211 may be determined by the specific shape of the electrode assembly 22. For example, if the electrode assembly 22 is in a cylinder structure, the casing 211 in a cylinder structure may be selected; and if the electrode assembly 22 is in a cuboid structure, the casing 211 in a cuboid structure may be selected. Certainly, the end cover 212 may also be in various structures. For example, the end cover 212 is in a plate-like structure or a hollow structure with an opening 2111 at one end, or the like. Exemplarily, in FIG. 3, the electrode assembly 22 is in a cylinder structure, and correspondingly, the casing 211 is in a cylinder structure, the end cover 212 is in a cylindrical plate-shaped structure, and the end cover 212 covers the opening 2111 of the casing 211.

Certainly, it can be understood that the shell 21 is not only limited to the above structure. The shell 21 may also be in other structure. for example, the shell 21 includes a casing 211 and two end covers 212. The casing 211 is a hollow structure with openings 2111 at opposite sides thereof. One end cover 212 correspondingly covers one opening 2111 of the casing 211 and forms a sealed connection to form a sealed space for accommodating the electrode assembly 22 and the electrolyte.

In some embodiments, the shell 21 may also include a positive electrode terminal and a negative electrode terminal. The positive electrode terminal may be installed on the end cover 212, and the negative electrode terminal may be installed on the end of the casing 211 opposite to the end cover 212. Of course, the positive electrode terminal may be installed on the end of the casing 211 opposite to the end cover 212, and the negative electrode terminal may be installed on the end cover 212. It is also possible that both the positive electrode terminal and the negative electrode terminal are installed on the end cover 212 or both are installed on the end of the casing 211 opposite to the end cover 212. The positive electrode terminal and the negative electrode terminal are both used to be electrically connected to the electrode assembly 22 to achieve inputting or outputting of electrical energy for the battery cell 20. In the above, the positive electrode terminal and the negative electrode terminal may be directly connected to the electrode assembly 22, for example, by welding or abutting. The positive electrode terminal and the negative electrode terminal may be indirectly connected to the electrode assembly 22, for example, the positive electrode terminal and the negative electrode terminal are first connected to other components, and then abuts against or is welded to the electrode assembly 22 through other components.

In the above, in FIG. 3, the battery cell 20 may further include current collecting members 23, the current collecting members 23 are accommodated in the shell 21, and the current collecting member 23 is used to connect the electrode assembly 22 and the positive electrode terminal or the negative electrode terminal of the shell 21 to achieve inputting or outputting of electric energy for the battery cell 20.

The current collecting member 23 serves to connect the electrode assembly 22 and the positive electrode terminal of the shell 21 or to connect the electrode assembly 22 and the negative electrode terminal of the shell 21. There are many ways to connect the current collecting member 23 with the electrode assembly 22 and with the positive electrode terminal or the negative electrode terminal of the shell 21, such as welding, abutting or bonding, etc.

Exemplarily, the battery cell 20 may include two current collecting members 23, and the electrode assembly 22 is respectively connected to the positive electrode terminal and the negative electrode terminal of the shell 21 through the two current collecting members 23, that is, the electrode assembly 22 is connected to the positive electrode terminal of the shell 21 through one current collecting member 23, and is connected to the negative electrode terminal of the shell 21 through the other current collecting member 23, so as to output or input the positive electrode and the negative electrode of the battery cell 20.

In some embodiments, the battery cell 20 may further include at least one pressure relief mechanism. The pressure relief mechanism may be mounted on the end cover 212, or may also be mounted on the casing 211. Similarly, there may be one or more pressure relief mechanisms. The pressure relief mechanism is used for releasing the internal pressure of the battery cell 20.

Exemplarily, the pressure relief mechanism may be a pressure relief component such as an explosion-proof valve, an explosion-proof sheet, an air valve, a pressure relief valve or a safety valve, etc.

It should be indicated that the electrode assembly 22 is a component in the battery cell 20 where electrochemical reactions occur. The electrode assembly 22 may be in various structures. For example, the electrode assembly 22 may be in a wound structure formed by means of winding, or may also be a laminated structure formed by means of stacking. Similarly, the electrode assembly 22 may also be in various shapes, for example, the shape of the electrode assembly 22 may be a cylindrical structure, an elliptical structure or a cuboid structure.

Figure 4:
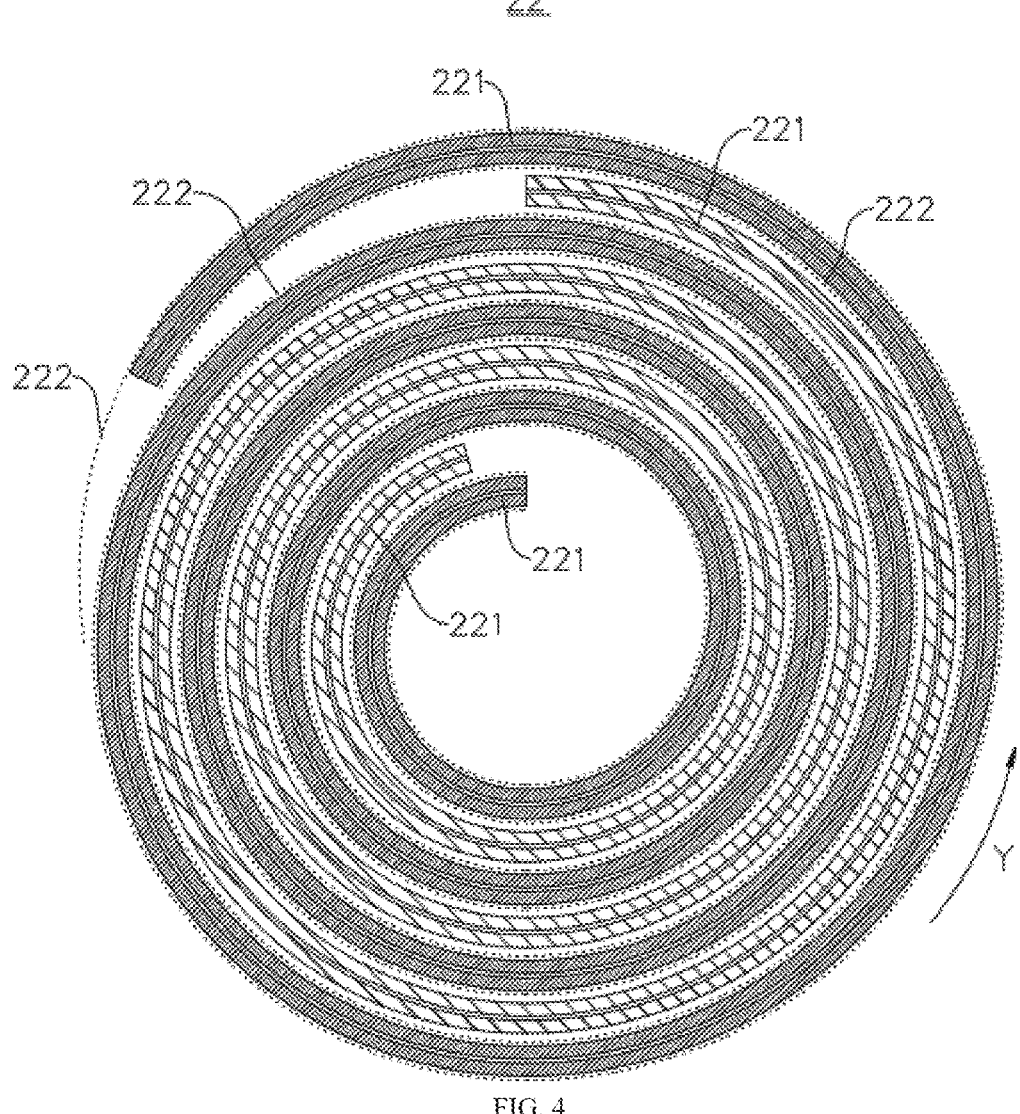
FIG. 4 is a sectional view of an electrode assembly provided by some embodiments of the present application.
Figure 5:
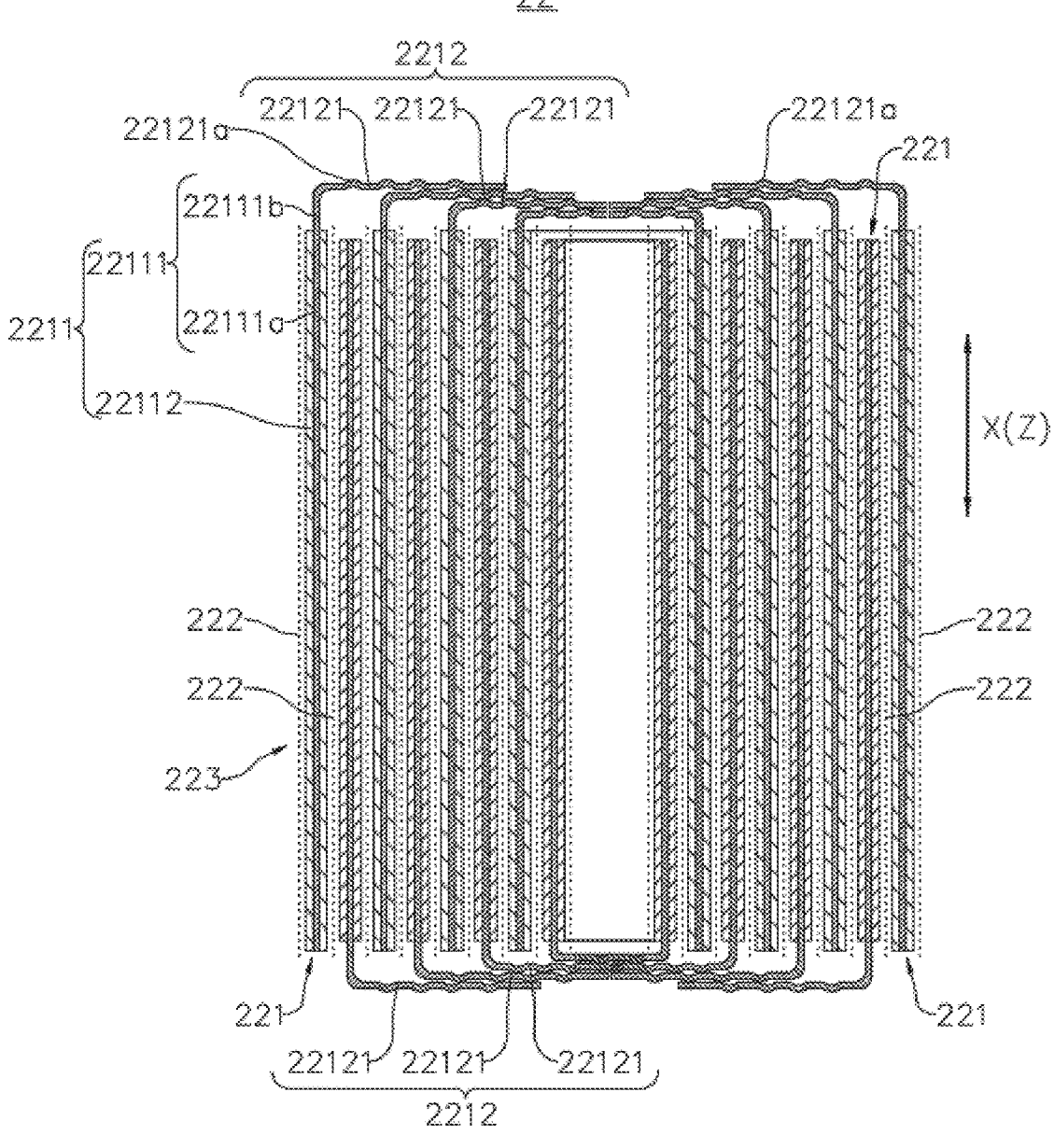
FIG. 5 is a sectional view of an electrode assembly provided by some embodiments of the present application.

In some embodiments, referring to FIG. 3, and further referring to FIG. 4 and FIG. 5, FIG. 4 is a sectional view of an electrode assembly 22 provided by some embodiments of the present application; and FIG. 5 is a sectional view of an electrode assembly 22 provided by some embodiments of the present application. The electrode assembly 22 is a wound structure formed by winding, and the shape of the electrode assembly 22 is cylinder.

In the above, the electrode assembly 22 may include two electrode sheets 221 with opposite polarities. The two electrode sheets 221 are wound around a central axis extending in the first direction X to form the electrode assembly 22 of a wound structure. That is, the two electrode sheets 221 with opposite polarities are respectively the positive electrode sheet and the negative electrode sheet of the electrode assembly 22, and the positive electrode sheet and the negative electrode sheet are wound to form the electrode assembly 22 of a wound structure. Certainly, in other embodiments, the electrode assembly 22 may also be of a laminated structure formed by stacking two electrode sheets 221 with opposite polarities.

Optionally, the electrode assembly 22 may further include a separation member 222, and the separation member 222 is provided between the two electrode sheets 221, to insulate and isolate the two electrode sheets 221, thereby effectively reducing the risk of short circuit of the electrode assembly 22 during use.

Exemplarily, the material of the separation member 222 may be various, for example, the material of the separation member 222 may be polypropylene or polyethylene, etc.

Figure 6:
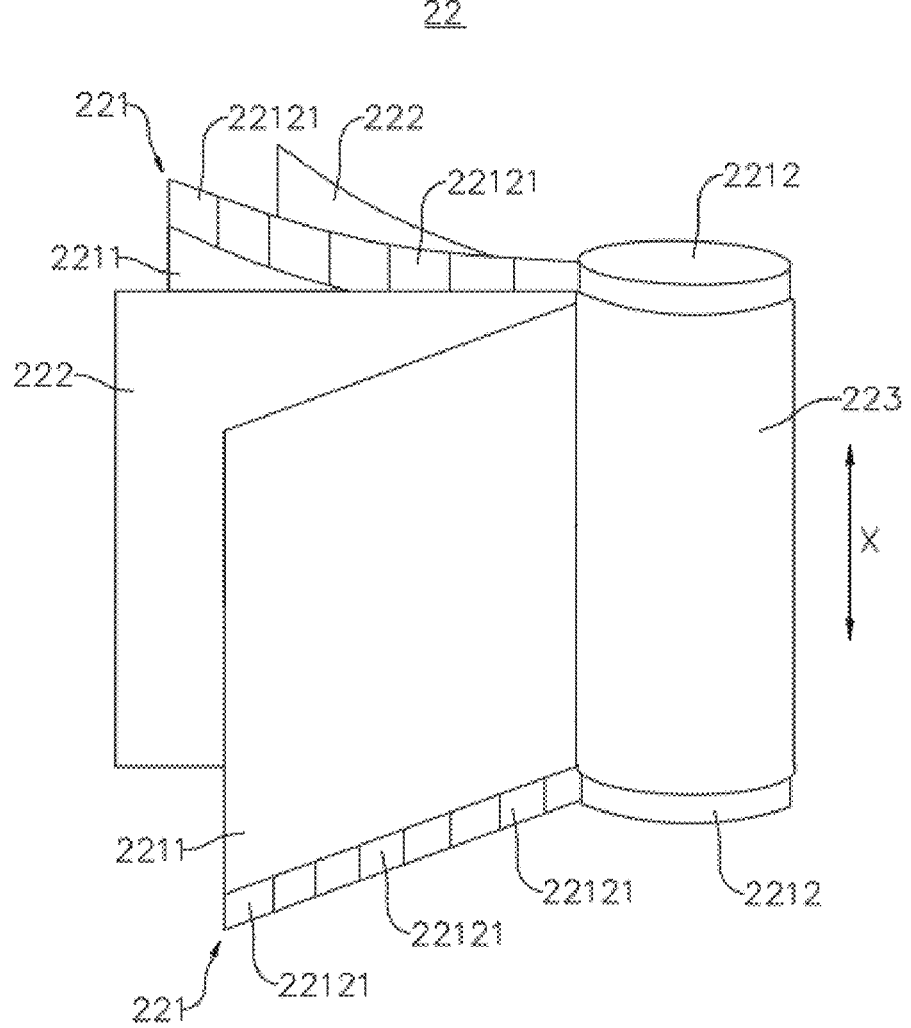
FIG. 6 is a schematic structural diagram of an electrode assembly, during winding, provided by some embodiments of the present application.
Figure 7:
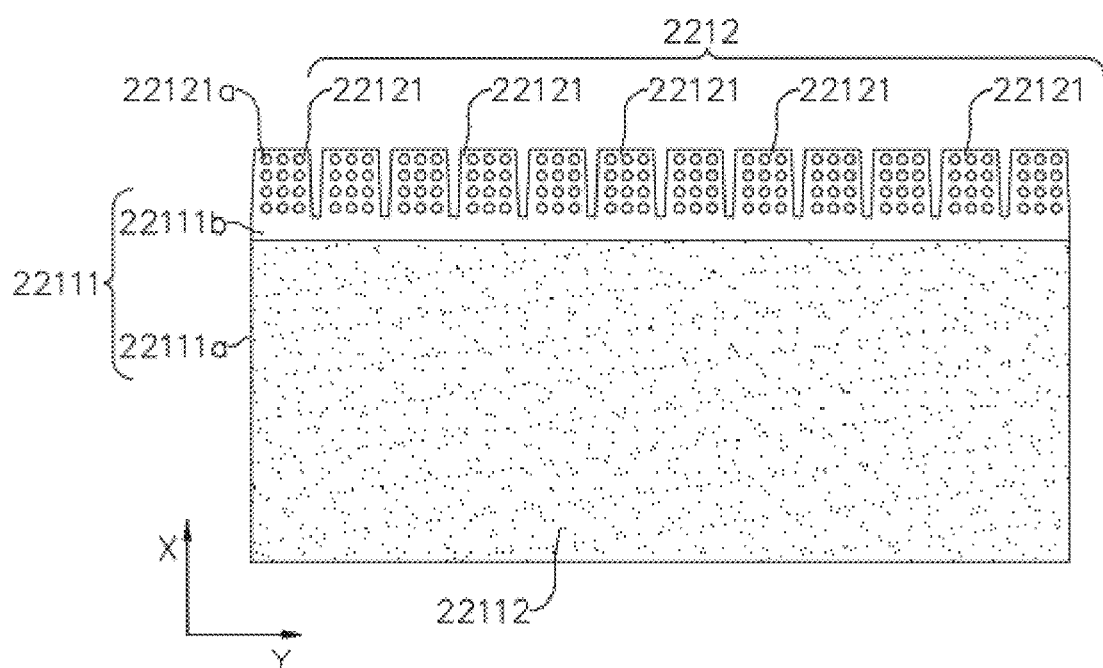
FIG. 7 is a schematic structural diagram of an electrode sheet of an electrode assembly, after unfolding, provided by some embodiments of the present application.
Figure 8:
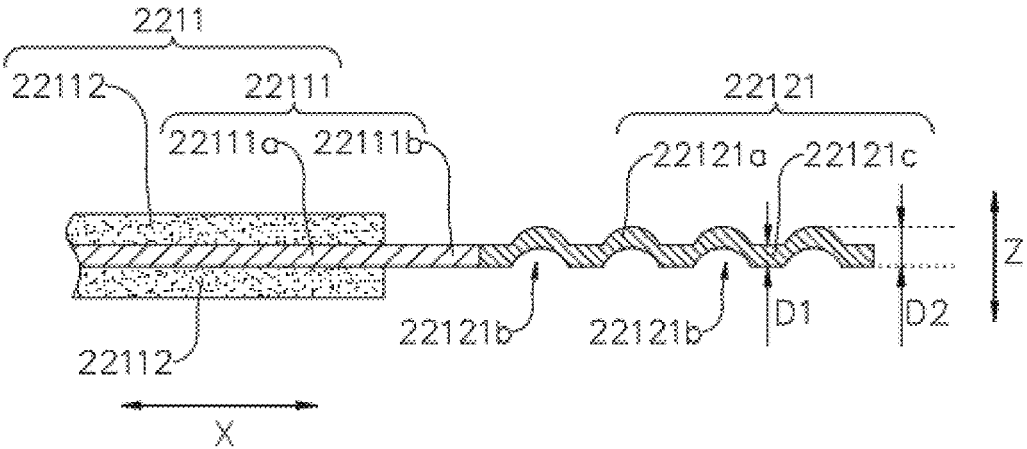
FIG. 8 is a local sectional view of an electrode sheet, after unfolding, provided by some embodiments of the present application.

According to some embodiments of the present application, referring to FIG. 4 and FIG. 5 and further referring to FIG. 6, FIG. 7 and FIG. 8, FIG. 6 is a schematic structural diagram of an electrode assembly 22, during winding, provided by some embodiments of the present application; FIG. 7 is a schematic structural diagram of an electrode sheet 221 of an electrode assembly 22, after unfolding, provided by some embodiments of the present application; and FIG. 8 is a local sectional view of an electrode sheet 221, after unfolding, provided by some embodiments of the present application. The present application provides an electrode assembly 22, including two electrode sheets 221 with opposite polarities and a separation member 222 for isolating the two electrode sheets 221. The two electrode sheets 221 and the separation member 222 are wound in a winding direction Y to form a main body 223 and two tabs 2212. The tabs 2212 and the main body 223 are provided in the first direction X, the tabs 2212 each include a plurality of tab portions 22121 provided at intervals in the winding direction Y, the tab portions 22121 are each provided bent relative to a first direction X, at least some of the plurality of tab portions 22121 are stacked in the first direction X, and at least one protrusion 22121a is provided on at least one side of each of the tab portions 22121 in the thickness direction thereof.

In the above, the electrode sheet 221 may include a body part 2211 and a tab 2212 connected to one end of the body part 2211 in the first direction X, and the body parts 2211 of the two electrode sheets 221 with opposite polarities and the separation member 222 are wound in the winding direction Y to form the main body 223 of the electrode assembly 22, and the winding central axis of the electrode assembly 22 extends in the first direction X, so that the tab 2212 of each electrode sheet 221 is formed at one end of the electrode assembly 22 in the first direction X, so that the tab 2212 and the main body 223 are provided in the first direction X.

Exemplarily, in FIG. 3, two electrode sheets 221 with opposite polarities each have a tab 2212, the two tabs 2212 have opposite polarities, and the two tabs 2212 are located at two ends of the main body 223 in the first direction X, respectively.

The body part 2211 of the electrode sheet 221 is a region of the electrode sheet 221 where the chemical reaction occurs in the battery cell 20, and which works mainly by relying on the movement of metal ions between the body parts 2211 of the two electrode sheets 221 with opposite polarities. The body part 2211 of the electrode sheet 221 includes a substrate 22111 and an active material layer 22112 provided on one side of the substrate 22111. The tab 2212 is connected to one end of the substrate 22111 in the first direction X. The active material layer 22112 is used to perform a chemical reaction in the battery cell 20 during the use of the battery cell 20.

The tab portion 22121 is provided bent relative to the first direction X, that is, when the electrode sheet 221 is not wound to form the electrode assembly 22 and is in an unfolded state, the tab portion 22121 is a structure extending in the first direction X. After the electrode sheet 221 is wound to form the electrode assembly 22, the tab portion 22121 needs to be bent so that the tab portion 22121 is provided at a non-zero angle with the first direction X, so as to make at least some tab portions 22121 of the multiple tab portions 22121 stacked in the first direction X to form a tab 2212.

In some embodiments, after the body parts 2211 of the two electrode sheets 221 and the separation member 222 are wound to form the main body 223 of the electrode assembly 22, the plurality of tab portions 22121 of the tab 2212 may be processed by a process of smoothing or flattening, etc., to make the tab portion 22121 bent relative to the first direction X, and at least some of the plurality of tab portions 22121 stacked in the first direction X. It should be noted that after the tab portion 22121 is bent relative to the first direction X, the thickness direction Z of the tab portion may be the same as the first direction X, or may be arranged at a small angle with the first direction X. For example, the angle between the thickness direction Z of the tab portion and the first direction X is less than or equal to 10°. For example, in FIG. 5, the thickness direction Z of the tab portion is the same as the first direction X. When the electrode sheet 221 is unfolded, as shown in FIG. 7, the extension direction of the body part 2211 of the electrode sheet 221 is the winding direction Y, so that the multiple tab portions 22121 of the tab 2212 are provided at intervals in the extension direction of the body part 2211. At the same time, after the electrode sheet 221 is unfolded, any two of the first direction X, the extension direction of the body part 2211 and the thickness direction Z of the tab portion are perpendicular to each other. At this time, the thickness direction of the substrate 22111 is the same as the thickness direction Z of the tab portion.

Optionally, the substrate 22111 and the tab 2212 may be of an integrated structure or a split structure. If the substrate 22111 and the tab 2212 are of an integrated structure, the multiple tab portions 22121 of the tab 2212 may be formed at one end of the substrate 22111 in the first direction X by means of cutting or the like; and if the substrate 22111 and the tab 2212 are of a split structure, the tab 2212 may be connected to one end of the substrate 22111 in the first direction X by means of welding or snapping or the like, where in the embodiment in which the substrate 22111 and the tab 2212 are of a split structure, the material of the substrate 22111 may be the same as the material of the tab 2212, or may be different from the material of the tab 2212.

The tab 2212 of the electrode sheet 221 is a component of the electrode sheet 221 for outputting or inputting electric energy for the electrode sheet 221. The tab 2212 includes a plurality of tab portions 22121 provided at intervals in the winding direction Y, so that after the electrode sheet 221 is wound to form the electrode assembly 22, it is convenient to process the plurality of tab portions 22121 of the tab 2212 by smoothing or flattening, etc., to make the plurality of tab portions 22121 of the tab 2212 stacked and then formed at one end of the electrode assembly 22 in the first direction X, and enabling outputting or inputting the positive electrode or negative electrode of the electrode assembly 22 after the tab 2212 is connected to the current collecting member 23.

The tab 2212 includes a plurality of tab portions 22121 provided at intervals in the winding direction Y, that is, after the tab 221 is unfolded, as shown in FIG. 7, the plurality of tab portions 22121 of the tab 2212 are provided at intervals in the extension direction of the body part 2211, and when the tab 221 is wound in the winding direction Y to form the electrode assembly 22, the extension direction of the body part 2211 is the same as the winding direction Y, and the plurality of tab parts 22121 are provided at intervals in the winding direction Y.

At least some of the multiple tab portions 22121 are stacked in the first direction X, that is, after the multiple tab portions 22121 of the tab 2212 are bent relative to the first direction X by a process such as smoothing or flattening, some tab portions 22121 in the multiple tab portions 22121 may be stacked in the first direction X, or all of the tab portions 22121 may be stacked in the first direction X. It should be noted that after the electrode sheet 221 is wound to form an electrode assembly 22 of a wound structure, the extension direction of the body part 2211 is the winding direction Y, so that the multiple tab portions 22121 of the tab 2212 are arranged at intervals in the winding direction of the electrode sheet 221. Therefore, when the tab 2212 undergoes a smoothing or flattening process, the multiple tab portions 22121 of the tab 2212 are smoothed in a direction from the outer edge of the electrode assembly 22 to the central axis of the electrode assembly 22, so that the multiple tab portions 22121 of the tab 2212 are of a structure in which some tab portions 22121 and some tab portions 22121 are stacked in the first direction X, and others and other tab portions 22121 are stacked in the first direction X. Certainly, in some embodiments, the tab 2212 may also be of a structure in which the multiple tab portions 22121 as a whole are stacked in the first direction X.

Protrusion(s) 22121a is formed on at least one side of the tab portion 22121 in the thickness direction thereof, that is, in the thickness direction Z of the tab portion, the tab portion 22121 may be provided with the protrusion(s) 22121a on only one side, or the tab portion 22121 may also be provided with the protrusion(s) 22121a on both sides. Similarly, the number of the protrusion(s) 22121a provided on the tab portion 22121 may be one or plural. Exemplarily, in FIG. 7 and FIG. 8, in the thickness direction Z of the tab portion, only one side of the tab portion 22121 is provided with protrusion(s) 22121a, and the number of the protrusion(s) 22121a is plural.

Optionally, there may be various processing methods for forming the protrusion(s) 22121a on the tab portion 22121, for example, adding a material to one side of the tab portion 22121 by a process such as welding or extrusion molding to form the protrusion(s) 22121a on one side of the tab portion 22121, or forming the protrusion(s) 22121a by means of stamping or rolling, etc. on one side of the tab portion 22121 and forming groove(s) 22121b on the side of the tab portion 22121 away from the protrusion(s) 22121a and at position(s) corresponding to the protrusion(s) 22121a. Exemplarily, in FIG. 8, the protrusion 22121a is protrusion 22121a formed by means of stamping or rolling, etc. on one side of the tab portion 22121 to form groove 22121b on the side of the tab portion 22121 away from the protrusion 22121a and at position corresponding to the protrusion 22121a. Two electrode sheets 221 with opposite polarities and a separation member 222 are wound in a winding direction Y to form an electrode assembly 22 of a wound structure, so that the electrode assembly 22 has a main body 223 and two tabs 2212, and the tabs 2212 and the main body 223 are provided in a first direction X. In the above, the tab 2212 is provided with a plurality of tab portions 22121 arranged at intervals in the winding direction Y, and the tab portions 22121 are each provided bent relative to the first direction X, so that at least some of the plurality of tab portions 22121 of the tab 2212 can be stacked in the first direction X, and at least one protrusion 22121a is provided on at least one side of the tab portion 22121 of the tab 2212, to increase the thickness of the plurality of tab portions 22121 stacked together and alleviate the phenomenon of small local thickness occurring after the plurality of tab portions 22121 of the tab are stacked, thereby improving the production quality of the tab 2212, reducing the risk of the tab 2212 being welded through during subsequent assembly and processing, and further facilitating reducing the phenomenon of damage to the electrode assembly 22, and facilitating improving the connection stability and assembly quality between the electrode assembly 22 and other components of the battery cell 20, so as to improve the production quality and use stability of the battery cell 20 having such electrode assembly 22.

Figure 9:
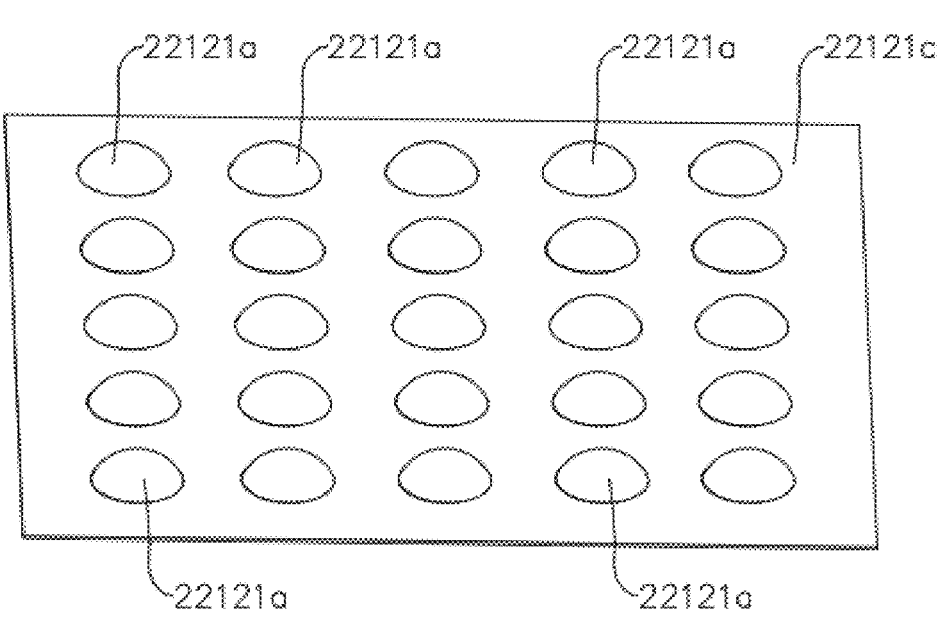
FIG. 9 is a schematic structural diagram of a tab portion provided by some embodiments of the present application.
Figure 10:
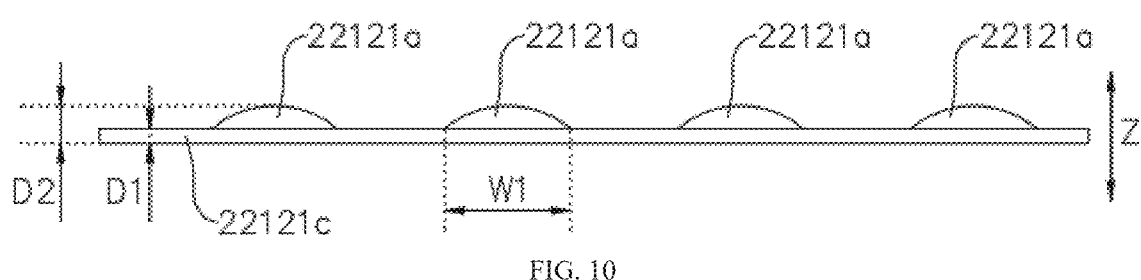
FIG. 10 is a front view of a tab portion provided by some embodiments of the present application.

According to some embodiments of the present application, referring to FIG. 7 and FIG. 8, and further referring to FIG. 9 and FIG. 10, FIG. 9 is a schematic structural diagram of a tab portion 22121 provided by some embodiments of the present application; and FIG. 10 is a front view of a tab portion 22121 provided by some embodiments of the present application. In the thickness direction Z of the tab portion, a plurality of protrusions 22121a are formed on at least one side of the tab portion 22121.

In the above, a plurality of protrusions 22121a are formed on at least one side of the tab portion 22121, that is, in the thickness direction Z of the tab portion, the tab portion 22121 may be provided with the plurality of protrusions 22121a on only one side, or the tab portion 22121 may also be provided with the plurality of protrusions 22121a on both sides.

Exemplarily, in FIG. 9 and FIG. 10, only one side of the tab portion 22121 is provided with the plurality of protrusions 22121a. The plurality of protrusions 22121a are provided on only one side of the tab portion 22121, facilitating reducing the processing difficulty of providing the protrusions 22121a on the tab portion 22121, thereby improving production efficiency.

By providing the plurality of protrusions 22121a on at least one side of the tab portion 22121, the tab portion 22121 is bent relative to the first direction X and the plurality of tab portions 22121 are stacked in the first direction X, so that the region with an cavity between two tab portions 22121 stacked and adjacent to each other can be effectively increased, which is conducive to further improving the overall thickness of the tab 2212 in the first direction X, and can improve the uniformity of the thickness of the tab 2212, thereby further alleviating the phenomenon that the tab 2212 is welded through during the subsequent assembly and processing.

According to some embodiments of the present application, continuing to refer to what is shown in FIG. 9 and FIG. 10, in the thickness direction Z of the tab portion, a projection area of the tab portion 22121 is $S_1$, and the sum of the projection areas of the plurality of protrusions 22121a on the tab portion 22121 is $S_2$, satisfying $S_2/S_1 \geq 0.5$.

In the above, in the thickness direction Z of the tab portion, the projection area of the tab portion 22121 is $S_1$, that is, the area of the region defined by the projection of the tab portion 22121 in the thickness direction Z of the tab portion is $S_1$.

In the thickness direction Z of the tab portion, the sum of projection areas of the plurality of protrusions 22121a on the tab portion 22121 is $S_2$, that is, the sum of the areas of the regions defined by the projections of protrusions 22121a in the thickness direction Z of the tab portion is $S_2$. It should be noted that if the protrusions 22121a are provided on only one side of the tab portion 22121, $S_2$ is the sum of the projection areas of the plurality of protrusions 22121a on one side of the tab portion 22121 in the thickness direction Z of the tab portion; and if the plurality of protrusions 22121a are provided on both sides of the tab portion 22121, $S_2$ is the sum of the projection areas of the plurality of protrusions 22121a on the two sides of the tab portion 22121 in the thickness direction Z of the tab portion.

Exemplarily, the sum $S_2$ of the projection areas of the plurality of protrusions 22121a on the tab portion 22121 may be 0.5 times, 0.55 times, 0.58 times, 0.6 times, 0.65 times, 0.7 times or 0.8 times, etc., the projection area $S_1$ of the tab portion 22121.

It should be noted that when obtaining $S_1$ and $S_2$, that is, when measuring the projection area $S_1$ of the tab portion 22121 and the sum $S_2$ of the projection areas of the plurality of protrusions 22121a on the tab portion 22121, it is necessary to first unfold the electrode sheet 221 and then measure (as shown in FIG. 7) to obtain $S_1$ and $S_2$, that is, $S_1$ is the projection area of the tab portion 22121 in the thickness direction Z of the tab portion when the electrode sheet 221 is in the unfolded state, and $S_2$ is the sum of the projection areas of the plurality of protrusions 22121a on the tab portion 22121 in the thickness direction Z of the tab portion when the tab 221 is in the unfolded state.

By setting the sum of the projection areas of the multiple protrusions 22121a on the tab portion 22121 in the thickness direction Z of the tab portion to be greater than or equal to a half of the projection area of the tab portion 22121 in the thickness direction Z of the tab portion, the area occupied by the plurality of protrusions 22121a on the tab portion 22121 is enabled to be half or more of that of the tab portion 22121, so that the tab portion 22121 has sufficient region for providing the protrusions 22121a, so as to enable the tab 2212 to have sufficient thickness after the plurality of tab portions 22121 of the tab 2212 are stacked in the first direction X, and effectively improve the uniformity of the thickness of the tab 2212 to reduce the risk of the tab 2212 being welded through during the subsequent assembly.

According to some embodiments of the present application, referring to FIG. 8 and FIG. 10, the tab portion 22121 includes a main body region 22121c that does not overlap with projections of the protrusions 22121a in the thickness direction Z of the tab portion, and the protrusions 22121a each protrude from the main body region 22121c in the thickness direction Z of the tab portion. In the thickness direction Z of the tab portion, the maximum dimension of the tab portion 22121 is $D_1$, and the thickness of the main body region 22121c is $D_2$, satisfying: $2 \leq D_1/D_2 \leq 8$.

In the above, the tab portion 22121 includes a main body region 22121c which does not overlap with the projections of the protrusions 22121a in the thickness direction Z of the tab portion, that is, the region of the tab portion 22121 where the protrusions 22121a are not formed is the main body region 22121c, so that the projection of the main body region 22121c in the thickness direction Z of the tab portion does not intersect with the projections of the protrusions 22121a in the thickness direction Z of the tab portion, that is, the protrusions 22121a protrude from one side of the body part 2211 in the thickness direction Z of the tab portion.

The maximum dimension of the tab portion 22121 is $D_1$, and the thickness of the main body region 22121c is $D_2$, satisfying $2 \leq D_1/D_2 \leq 8$, that is, the maximum thickness of the tab portion 22121 in its thickness direction is 2 to 8 times the wall thickness of the main body region 22121c itself, that is, the maximum thickness of the tab portion 22121 after the protrusions 22121a are formed by a process of stamping or rolling, etc. is 2 to 8 times the thickness of the tab portion 22121 before the process of stamping or rolling, etc. is performed.

Exemplarily, the maximum dimension $D_1$ of the tab portion 22121 may be 2 times, 2.5 times, 2.8 times, 3 times, 3.5 times, 4 times, 5 times, 6 times, 8 times, etc., the thickness $D_2$ of the main body region 22121c.

It should be noted that if the electrode sheet 221 is a positive electrode sheet, the tab 2212 corresponding to the electrode sheet 221 is a positive tab, and the thickness of the tab portion 22121 of the positive tab before stamping or rolling to form the protrusions 22121a is 10 μm-16 μm; and if the electrode sheet 221 is a negative electrode sheet, the tab 2212 corresponding to the electrode sheet 221 is a negative tab, and the thickness of the tab portion 22121 of the negative tab before stamping or rolling to form the protrusions 22121a is 4 μm-10 μm.

The tab portion 22121 has a main body region 22121c not overlapping with the projection of the protrusion 22121a in the thickness direction Z of the tab portion, and the protrusion 22121a protrudes from the main body region 22121c in the thickness direction Z of the tab portion, that is, the main body region 22121c of the tab portion 22121 is the region of the tab portion 22121 not provided with the protrusion 22121a. By setting the maximum dimension of the tab portion 22121 in the thickness direction Z of the tab portion to be 2 to 8 times the thickness of the main body region 22121c, that is, the maximum thickness of the tab portion 22121 provided with the protrusion 22121a is 2 to 8 times the thickness of the main body region 22121c of the tab portion 22121, so that after the tab portion 22121 is bent relative to the first direction X, the thickness of the plurality of tab portions 22121 of the tab 2212 stacked in the first direction X is effectively increased, to realize increase in the thickness of the tab 2212 and further effectively alleviate the phenomenon of the tab 2212 being welded through during the subsequent assembly and processing.

According to some embodiments of the present application, referring to what is shown in FIG. 7, FIG. 9 and FIG. 10, the tab portion 22121 is provided with a plurality of rows of protrusions 22121a, and each row of protrusions 22121a include a plurality of the protrusions 22121a provided at intervals.

In the above, the tab portion 22121 is provided with multiple rows of protrusions 22121a, and each row of protrusions 22121a include multiple protrusions 22121a arranged at intervals. That is, the multiple protrusions 22121a on the tab portion 22121 are arranged in an array, so that the multiple protrusions 22121a are arranged in multiple rows and columns. Before the electrode sheet 221 is not wound, that is, in the structure in which the electrode sheet 221 is unfolded, the plurality of protrusions 22121a in each row may be arranged at intervals in the first direction X, or may be arranged at intervals in the winding direction Y (the extension direction of the body part 2211).

Figure 11:
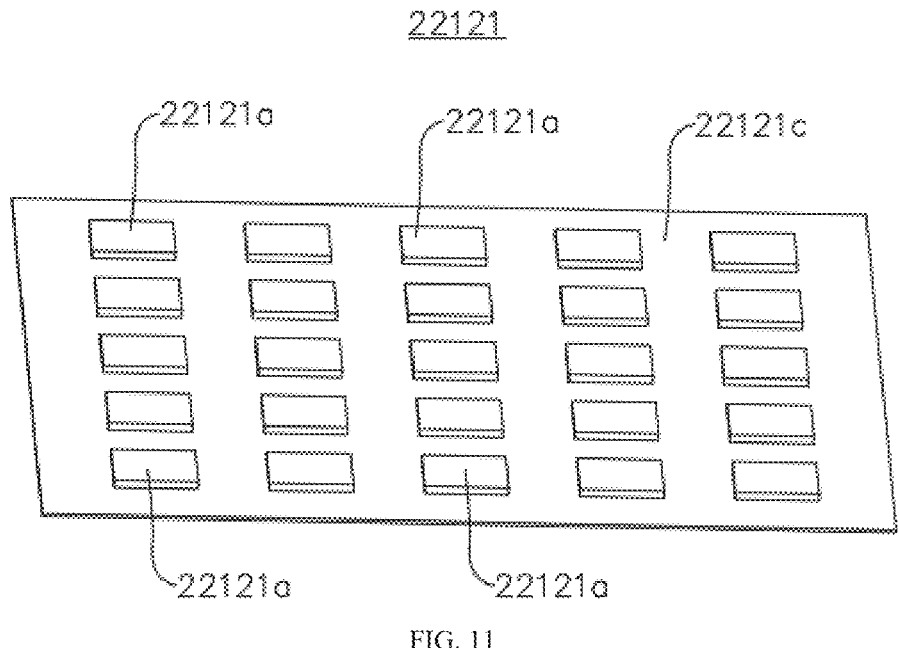
FIG. 11 is a schematic structural diagram of a tab portion provided by yet some embodiments of the present application.
Figure 12:
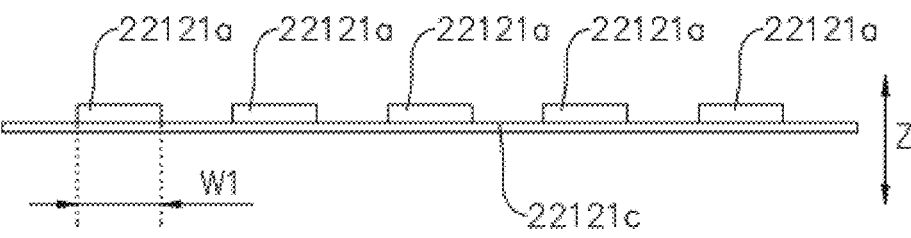
FIG. 12 is a front view of a tab portion provided by yet some embodiments of the present application.

In the tab portion 22121 of this structure, the protrusion 22121a may be in various shapes. Exemplarily, in FIG. 9 and FIG. 10, the protrusion 22121a is a hemispherical structure. Referring to FIG. 11 and FIG. 12, FIG. 11 is a schematic structural diagram of a tab portion 22121 provided by yet some embodiments of the present application; and FIG. 12 is a front view of a tab portion 22121 provided by yet some embodiments of the present application. The protrusion 22121a may also be in a square columnar structure. Certainly, the structure of the protrusion 22121a is not limited thereto. In other embodiments, the protrusion 22121a may also be in a cylindrical structure, a triangular columnar structure, a pentagonal columnar structure, etc.

The tab portion 22121 is provided with the plurality of rows of protrusions 22121a and each row of protrusions 22121a include the plurality of protrusions 22121a provided at intervals, to make the plurality of protrusions 22121a on the tab portion 22121 provided in an array, so that after the plurality of tab portions 22121 of the tab 2212 are stacked in the first direction X, the region with an cavity between two tab portions 22121 stacked and adjacent to each other can be effectively increased, which is conducive to further increasing the overall thickness of the tab 2212 in the first direction X, and can effectively improve the uniformity of the thickness of the tab 2212 to reduce the phenomenon that the tab 2212 is welded through during the subsequent assembly.

In some embodiments, referring to what is shown in FIG. 10 and FIG. 12, the maximum dimension of the protrusion 22121a in a direction perpendicular to the thickness direction Z of the tab portion is $W_1$, satisfying 0.3 mm$\leq W_1 \leq$2 mm.

In the above, the maximum dimension of the protrusion 22121a in the direction perpendicular to the thickness direction Z of the tab portion is $W_1$, that is, in any direction within the plane perpendicular to the thickness direction Z of the tab portion, the maximum width of the protrusion 22121a is $W_1$, that is, in the plane perpendicular to the thickness direction Z of the tab portion, the maximum width of the protrusion 22121a in its radial direction is $W_1$. For example, if the protrusion 22121a is in a hemispherical structure or a cylindrical structure, $W_1$ is the diameter of the protrusion 22121a; and if the protrusion 22121a is a square columnar structure, $W_1$ is the length of the diagonal line of the protrusion 22121a.

Exemplarily, the maximum dimension $W_1$ of the protrusion 22121a in a direction perpendicular to the thickness direction Z of the tab portion may be 0.3 mm, 0.5 mm, 0.8 mm, 1 mm, 1.2 mm, 1.5 mm or 2 mm, etc.

The maximum dimension of the protrusion 22121a in the direction perpendicular to the thickness direction Z of the tab portion is set to be 0.3 mm to 3 mm, that is, the maximum dimension of the protrusion 22121a in its radial direction is 0.3 mm to 3 mm, which on the one hand, alleviates the phenomenon of excessive processing difficulty caused by too small dimension of the protrusion 22121a to reduce the processing difficulty of the tab portion 22121, and on the other hand, alleviates the phenomenon that the number of the plurality of protrusions 22121a on the tab portion 22121 is limited due to too large dimension of the protrusion 22121a. In addition, in the embodiment in which groove(s) 22121b is provided on the side of the tab portion 22121 away from the protrusion(s) 22121a and at position(s) corresponding to the protrusion(s) 22121a, adopting this structure can effectively alleviate the phenomenon caused by the overlarge dimension of the protrusion 22121a that the protrusions 22121a and the grooves 22121b of two adjacent tab portions 22121 overlap and offset each other after the multiple tab portions 22121 of the tab 2212 are stacked, thereby providing a cavity between the two tab portions 22121 stacked and adjacent to each other to increase the overall thickness of the tab 2212.

Figure 13:
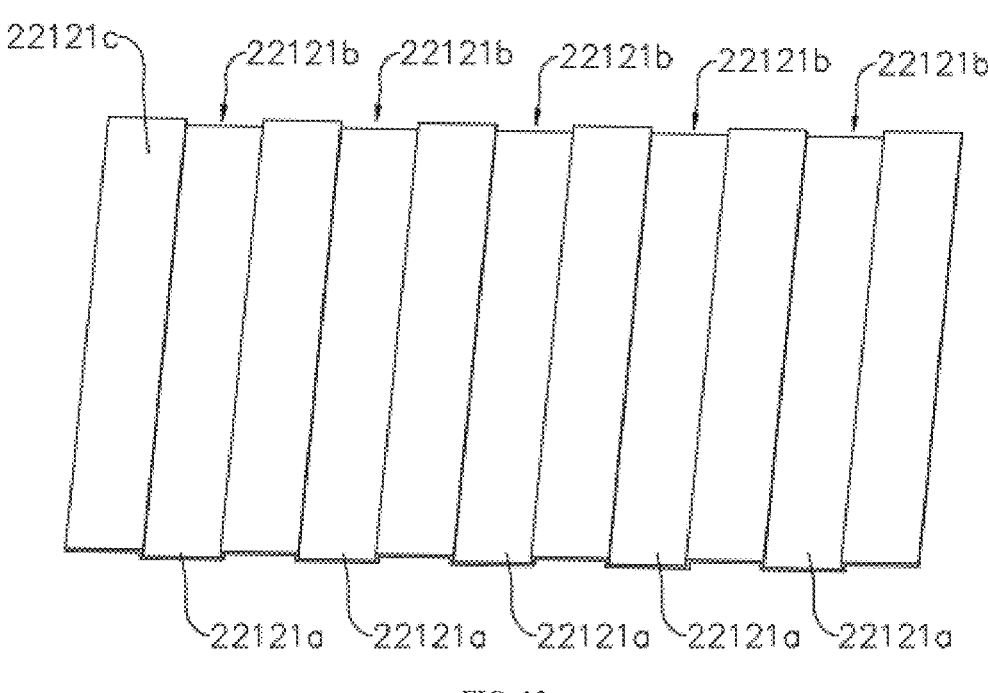
FIG. 13 is a schematic structural diagram of a tab portion provided by still some embodiments of the present application.
Figure 14:
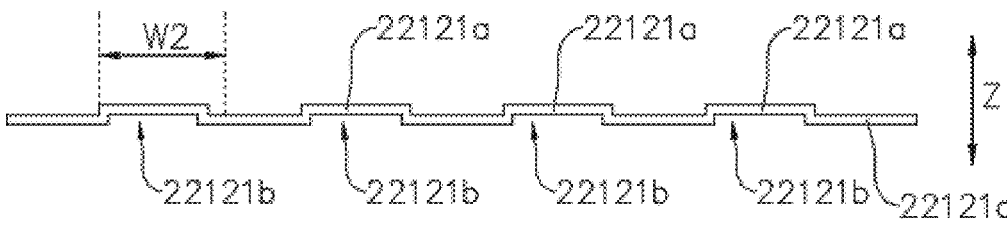
FIG. 14 is a front view of a tab portion provided by still some embodiments of the present application.

According to some embodiments of the present application, referring to FIG. 13 and FIG. 14, FIG. 13 is a schematic structural diagram of a tab portion 22121 provided by still some embodiments of the present application; and FIG. 14 is a front view of a tab portion 22121 provided by still some embodiments of the present application. The tab portion 22121 is provided with a plurality of protrusions 22121a arranged at intervals, and two ends of each protrusion 22121a extend in a direction perpendicular to an arrangement direction of the plurality of protrusions 22121a, to two ends of the tab portion 22121 respectively.

In the above, the arrangement direction of the plurality of protrusions 22121a refers to a direction in which the plurality of protrusions 22121a are arranged in sequence and at intervals in a plane perpendicular to the thickness direction Z of the tab portion.

The two ends of the protrusion 22121a extend respectively to the two ends of the tab portion 22121 in a direction perpendicular to the arrangement direction of the multiple protrusions 22121a, that is, the protrusion 22121a is a strip-shaped structure, and the two ends of the protrusion 22121a extend respectively to the two ends of the tab portion 22121 in a direction perpendicular to the arrangement direction of the multiple protrusions 22121a, so that the multiple protrusions 22121a are arranged in a manner of being provided at intervals in the width direction of the protrusion 22121a. It should be noted that when the electrode sheet 221 is in the unfolded state, the extension direction of the protrusion 22121a of the strip-shaped structure may be the first direction X, or may be the winding direction Y (the extension direction of the body part 2211).

Exemplarily, in FIG. 13 and FIG. 14, the protrusion 22121*a* is a strip-shaped structure with a rectangular cross section. Certainly, in other embodiments, the protrusion 22121*a* may also be a strip-shaped structure with a cross section in a semicircular, pentagonal or other shape.

A plurality of protrusions 22121*a* are formed on the tab portion 22121 at intervals, and two ends of each protrusion 22121*a* extend to two ends of the tab portion 22121, so as to realize a structure in which a plurality of protrusions 22121*a* are provided on the tab portion 22121. The use of such a structure is conducive to reducing the difficulty of providing the protrusions 22121*a* on the tab portion 22121, so as to improve the processing efficiency of the tab portion 22121.

In some embodiments, referring to what is shown in FIG. 14, in the arrangement direction of the plurality of protrusions 22121*a*, the width of the protrusion 22121*a* is $W_2$, satisfying $0.3 \text{ mm} \le W_2 \le 2 \text{ mm}$.

In the above, the width of the protrusion 22121*a* is $W_2$, that is, in the arrangement direction of the plurality of protrusions 22121*a*, the maximum dimension of the protrusion 22121*a* is $W_2$.

Exemplarily, the width $W_2$ of the protrusion 22121*a* may be 0.3 mm, 0.5 mm, 0.8 mm, 1 mm, 1.2 mm, 1.5 mm or 2 mm, etc.

The width of the protrusion 22121*a* in the arrangement direction of the plurality of protrusions 22121*a* is set to be 0.3 mm to 3 mm, that is, the dimension of the protrusion 22121*a* in the direction perpendicular to the extension direction of the protrusion 22121*a* is 0.3 mm to 3 mm, which on the one hand, alleviates the phenomenon of excessive processing difficulty caused by too small width of the protrusion 22121*a* to reduce the processing difficulty of the tab portion 22121, and on the other hand, alleviates the phenomenon that the number of the plurality of protrusions 22121*a* on the tab portion 22121 is limited due to too large width of the protrusion 22121*a*. In addition, in the embodiment in which groove(s) 22121*b* is provided on the side of the tab portion 22121 away from the protrusion(s) 22121*a* and at position(s) corresponding to the protrusion(s) 22121*a*, adopting this structure can effectively alleviate the phenomenon caused by the overlarge width of the protrusion 22121*a* that the protrusions 22121*a* and the grooves 22121*b* of two adjacent tab portions 22121 overlap and offset each other after the multiple tab portions 22121 of the tab 2212 are stacked, thereby providing a cavity between the two tab portions 22121 stacked and adjacent to each other to satisfy the requirement that the smoothen tab 2212 has sufficient thickness.

Figure 15:
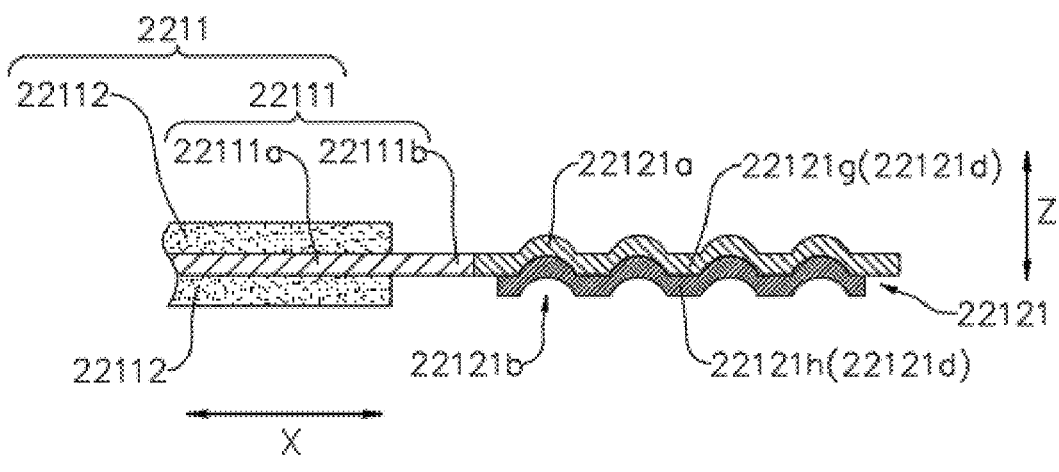
FIG. 15 is a local sectional view of an electrode sheet, after unfolding, provided by other embodiments of the present application.
Figure 16:
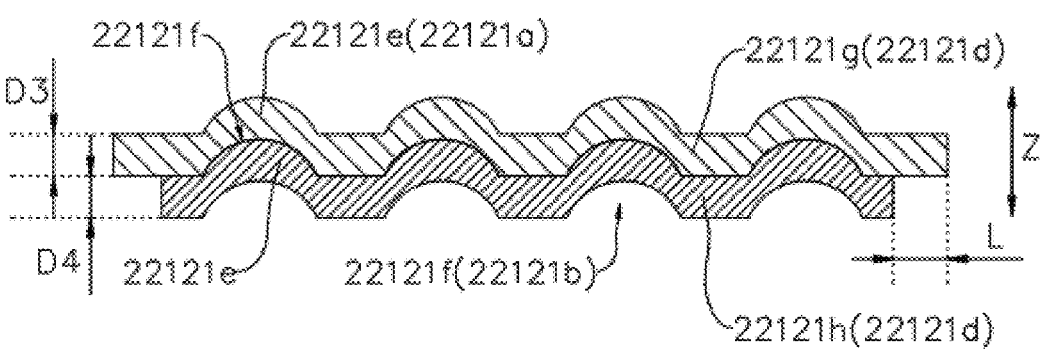
FIG. 16 is a sectional view of a tab portion of an electrode sheet provided by other embodiments of the present application.

According to some embodiments of the present application, referring to FIG. 15 and FIG. 16, FIG. 15 is a local sectional view of an electrode sheet 221, after unfolding, provided by other embodiments of the present application; and FIG. 16 is a sectional view of a tab portion 22121 of an electrode sheet 221 provided by other embodiments of the present application. In the thickness direction Z of the tab portion, the tab portion 22121 may include a plurality of foils 22121*d* stacked, convex portion(s) 22121*e* is formed on one side of the foil 22121*d*, and concave portion(s) 22121*f* is formed on the other side at position(s) corresponding to the convex portion(s) 22121*e*, and in two adjacent foils 22121*d*, the convex portion(s) 22121*e* of one foil 22121*d* is accommodated in the concave portion(s) 22121*f* of the other foil 22121*d*. In the thickness direction Z of the tab portion, the convex portion 22121*e* located on one side of the tab portion 22121 is the protrusion 22121*a*.

In the above, in the thickness direction Z of the tab portion, the tab portion 22121 includes a plurality of foils 22121*d* stacked, that is, the tab portion 22121 is composed of a plurality of foils 22121*d*, and the plurality of foils 22121*d* are stacked in the thickness direction Z of the tab portion to form the tab portion 22121 of the tab 2212. Exemplarily, in FIG. 15 and FIG. 16, the tab portion 22121 may include two foils 22121*d*, one foil 22121*d* of the two foils 22121*d* is connected to the body part 2211, and the other foil 22121*d* is stacked, in the thickness direction Z of the tab portion, on one side of the foil 22121*d* connected to the body part 2211. Certainly, in other embodiments, the tab portion 22121 may be formed by stacking three, four, five or six foils 22121*d*. It should be noted that in some embodiments, the tab portion 22121 may also include only one foil 22121*d*.

Convex portion(s) 22121*e* is formed on one side of the foil 22121*d*, and concave portion(s) 22121*f* is formed on the other side at position(s) corresponding to the convex portion(s) 22121*e*. That is, in the thickness direction Z of the tab portion, convex portion(s) 22121*e* protruding from the foil 22121*d* is formed on one side of the foil 22121*d*, and concave portion(s) 22121*f* is formed on the other side at position(s) corresponding to the convex portion(s) 22121*e*, so that the convex portion(s) 22121*e* and the concave portion(s) 22121*f* are arranged in a one-to-one correspondence in the thickness direction Z of the tab portion.

In two adjacent foils 22121*d*, the convex portion 22121*e* of one foil 22121*d* is accommodated in the concave portion 22121*f* of the other foil 22121*d*, that is, in the thickness direction Z of the tab portion, in the two foils 22121*d* stacked and adjacent to each other, the convex portion 22121*e* of one foil 22121*d* and the groove 22121*b* of the other foil 22121*d* are arranged in a one-to-one correspondence, so that the convex portion 22121*e* of one foil 22121*d* may be embedded in the groove 22121*b* of the other foil 22121*d*, so as to achieve close attachment between the two foils 22121*d*.

In the thickness direction Z of the tab portion, the convex portion 22121*e* located on one side of the tab portion 22121 is the protrusion 22121*a*. That is, the convex portions 22121*e* of the foils 22121*d* located on one side among the multiple foils 22121*d* of the tab portion 22121 are the protrusions 22121*a* on one side of the tab portion 22121, and correspondingly, the concave portions 22121*f* of the foils 22121*d* located on the other side among the multiple foils 22121*d* of the tab portion 22121 are the groove 22121*b* on the other side of the tab portion 22121.

Exemplarily, the plurality of foils 22121*d* of the tab portion 22121 may be connected in various ways, such as snapping, bonding or welding, etc.

The tab portion 22121 is provided as a structure in which multiple foils 22121*d* are stacked, and convex portions 22121*e* are formed on one side of the foil 22121*d* and concave portions 22121*f* are formed on the other side, so that after the multiple foils 22121*d* are stacked, the convex portions 2121*e* and concave portions 22121*f* of two adjacent foils 22121*d* may be embedded in each other, to realize that protrusions 22121*a* are formed at one side of the tab portion 22121 in the thickness direction Z of the tab portion. The tab portion 22121 adopting such structure can effectively increase the thickness and structural strength of the tab portion 22121 itself, so that after the multiple tab portions 22121 of the tab 2212 are stacked in the first direction X, the overall thickness and structural strength of the tab 2212 can be further increased, so as to further reduce the risk of the tab 2212 being welded through during the subsequent assembly.

According to some embodiments of the present application, referring to what is shown in FIG. 16, a plurality of foils 22121*d* are connected by welding to form convex portion(s) 22121*e* and concave portion(s) 22121*f* on the foil 22121*d*. That is, in the process of welding the multiple foils 22121*d* to each other, convex portions 22121*e* and concave portions 22121*f* are correspondingly formed at the positions where they are welded to each other, that is, the convex portions 22121*e* and concave portions 22121*f* on the foil 22121*d* are structures formed by welding the multiple foils 22121*d*.

Exemplarily, a plurality of foils 22121*d* are connected by ultrasonic roller welding to form convex portions 22121*e* and concave portions 22121*f* at the positions where the foils 22121*d* are welded. The specific connection method of ultrasonic roller welding may be found in the related art and will not be described here.

The plurality of foils 22121*d* stacked are connected by means of welding, and convex portions 22121*e* and concave portions 22121*f* are formed by means of welding at the positions where the plurality of foils 22121*d* are welded to each other, which, on the one hand, facilitates improving the connection strength and connection stability between the plurality of foils 22121*d*, and on the other hand, facilitates reducing the processing difficulty of forming concave portions 22121*f* and convex portions 22121*e* on the foil 22121*d*, so as to optimize the production takt of the electrode sheet 221 and thereby effectively improve the production efficiency of the electrode sheet 221.

According to some embodiments of the present application, referring to FIG. 5, FIG. 15 and FIG. 16, the electrode sheet 221 may include a body part 2211, a plurality of tab portions 22121 are connected to the body part 2211, and the body part 2211 of the two electrode sheets 221 and the separation member 222 are wound in a winding direction Y to form the main body 223. The body part 2211 includes a substrate 22111 and an active material layer 22112 provided on at least one side of the substrate 22111. The plurality of foils 22121*d* may include a first foil 22121*g* and a second foil 22121*h* which are stacked. The first foil 22121*g* is connected to one end of the substrate 22111 in the first direction X and is integrally formed with the substrate 22111. The second foil 22121*h* is provided separated from the substrate 22111.

In the above, multiple tab portions 22121 of the tab 2212 are connected to one end of the body part 2211 in the first direction X. When the tab 221 is in an unfolded state, the tab 2212 and the body part 2211 are arranged in the first direction X, and the multiple tab portions 22121 of the tab 2212 are arranged at intervals in the extension direction of the body part 2211; and after the electrode sheet 221 is wound to form the electrode assembly 22, and the tab portion 22121 is bent relative to the first direction X, the multiple tab portions 22121 of the tab 2212 are arranged at intervals in the winding direction Y, and the tab portion 22121 is connected to one end of the body part 2211 in the first direction X, and is arranged at a non-zero angle with the body part 2211.

The active material layer 22112 is provided on at least one side of the substrate 22111, that is, the substrate 22111 may be provided with the active material layer 22112 on only one side, or the substrate 22111 may be provided with the active material layer 22112 on both sides. Exemplarily, in FIG. 15, two sides of the substrate 22111 are each provided with an active material layer 22112.

The active material layer 22112 is the region in the battery cell 20 where chemical reactions occur, and mainly works by relying on the movement of metal ions between the active material layers 22112 of the two electrode sheets 221. Of course, in some embodiments, the substrate 22111 may be coated with an insulating protective layer, and the insulating protective layer is disposed at one end or two ends of the active material layer 22112 in the first direction X to protect and separate the active material layer 22112. Certainly, in other embodiments, the insulating protective layer may be not provided at one end of the active material layer 22112 in the first direction X, that is, the substrate 22111 is coated with only the active material layer 22112.

It should be noted that if the electrode sheet 221 is a positive electrode sheet, the material of the active material layer 22112 of the body part 2211 corresponding to the electrode sheet 221 may be lithium cobalt oxide, lithium iron phosphate, ternary lithium or lithium manganate, etc.; and if the electrode sheet 221 is a negative electrode sheet, the material of the active material layer 22112 of the body part 2211 corresponding to the electrode sheet 221 may be carbon or silicon, etc.

The first foil 22121*g* is connected to one end of the substrate 22111 in the first direction X and is integrally formed with the substrate 22111, that is, the first foil 22121*g* is connected to the substrate 22111, and the first foil 22121*g* is a structure formed on the substrate 22111 by cutting and processing. Certainly, in other embodiments, the first foil 22121*g* and the substrate 22111 may also be of a split structure. For example, the first foil 22121*g* is connected to one end of the substrate 22111 in the first direction X by welding or the like. Similarly, the first foil 22121*g* may also be indirectly connected to the substrate 22111. For example, the first foil 22121*g* and the substrate 22111 are indirectly connected via other conductive components.

Exemplarily, one end of the first foil 22121*g* in a direction perpendicular to the thickness direction Z of the tab portion is connected to one end of the substrate 22111 in the first direction X.

It should be noted that after the electrode sheet 221 is unfolded, the thickness direction Z of the tab portion and the first direction X are perpendicular to each other, then one end of the first foil 22121*g* in a direction perpendicular to the thickness direction Z of the tab portion is connected to one end of the substrate 22111 in the first direction X, that is, one end of the first foil 22121*g* in the first direction X is connected to one end of the substrate 22111 in the first direction X (see what is shown in FIG. 15).

The second foil 22121*h* and the substrate 22111 are separately provided, that is, the second foil 22121*h* and the substrate 22111 are two components independent from each other. Exemplarily, in FIG. 15, the second foil 22121*h* is stacked on and connected to one side of the first foil 22121*g* in the thickness direction Z of the tab portion. It should be noted that in other embodiments, in the thickness direction Z of the tab portion, the first foil 22121*g* may be provided with the second foil 22121*h* on only one side, or may be provided with the second foil 22121*h* on both sides, and the number of the second foil 22121*h* provided on one side of the first foil 22121*g* may be one or plural.

The multiple foils 22121*d* include a first foil 22121*g* that is integrally formed with the substrate 22111 of the body part 2211 of the electrode sheet 221. In actual production, a region of the substrate 22111 provided with no active material layer 22112 may be reserved, so that the first foil 22121*g* may be provided on the region, and then the second foil(s) 22121*h* may be stacked on one side of the first foil 22121*g*, so that the first foil 22121*g* may provide a connection support point for the second foil(s) 22121*h*, so as to achieve an increase in the thickness and structural strength of the tab portion 22121. An electrode sheet 221 adopting such structure can effectively reduce the processing difficulty of connecting the tab portion 22121 to the substrate 22111, facilitating improving the production efficiency of the electrode assembly 22.

According to some embodiments of the present application, referring to what is shown in FIG. 5 and FIG. 15, the substrate 22111 includes a coating region 22111*a* and a spacing region 22111*b*, the coating region 22111*a* and the spacing region 22111*b* are arranged in a first direction X, the active material layer 22112 is disposed in the coating region 22111*a*, and the spacing region 22111*b* connects the coating region 22111*a* and the first foil 22121*g*.

In the above, the spacing region 22111*b* of the substrate 22111 is a region of the substrate 22111 that is not coated with the active material layer 22112. The coating region 22111*a* and the spacing region 22111*b* are arranged in the first direction X, and the spacing region 22111*b* connects the coating region 22111*a* and the first foil 22121*g*, that is, when the electrode sheet 221 is unfolded, the spacing region 22111*b* is connected between the coating region 22111*a* and the first foil 22121*g* in the first direction X.

In FIG. 15, the spacing region 22111*b* is a blank region on the substrate 22111. It should be noted that in some embodiments, the spacing region 22111*b* on the substrate 22111 that is not coated with the active material layer 22112 may also be coated with an insulating protective layer, etc., to protect the active material layer 22112. Certainly, in other embodiments, the substrate 22111 of the body part 2211 may be not provided with the spacing region 22111*b*, that is, the first foil 22121*g* is directly connected to the coating region 22111*a* of the substrate 22111, that is, the active material layer 22112 completely covers one side of the substrate 22111, so that the first foil 22121*g* is connected to one end of the substrate 22111.

The substrate 22111 is provided with the coating region 22111*a* coated with an active material layer 22112 and the spacing region 22111*b* not coated with an active material layer 22112, so that the first foil 22121*g* of the tab portion 22121 may be connected to the coating region 22111*a* through the spacing region 22111*b* to achieve that the tab portion 22121 and the active material layer 22112 are spacedly provided in the first direction X. On the one hand, the electrode assembly 22 adopting this structure can isolate through the spacing region 22111*b* the stress generated during the bending process of the tab portion 22121 relative to the first direction X, so as to reduce the risk of occurrence of fracture of the active material layer 22112 provided on the coating region 22111*a*. On the other hand, in the subsequent process of welding the tab 2212 to other components, the influence on the active material layer 22112 during welding process can be reduced, thereby alleviating the phenomenon of damage to the active material layer 22112 and further facilitating improving the production quality of the electrode assembly 22.

According to some embodiments of the present application, referring to what is shown in FIG. 16, in the thickness direction Z of the tab portion, the thickness of the first foil 22121*g* is $D_3$ and the thickness of the second foil 22121*h* is $D_4$, satisfying $0.5 \leq D_3/D_4 \leq 2$.

In the above, the thickness $D_3$ of the first foil 22121*g* is the wall thickness of the first foil 22121*g* itself, that is, the thickness $D_3$ of the first foil 22121*g* is the thickness of the region of the first foil 22121*g* where the convex portions 22121*e* and the concave portions 22121*f* are not formed, that is, the thickness $D_3$ of the first foil 22121*g* is the thickness of the first foil 22121*g* before the convex portions 22121*e* and the concave portions 22121*f* are formed by processing.

The thickness $D_4$ of the second foil 22121*h* is the wall thickness of the second foil 22121*h* itself, that is, the thickness $D_4$ of the second foil 22121*h* is the thickness of the region of the second foil 22121*h* where the convex portions 22121*e* and the concave portions 22121*f* are not formed, that is, the thickness $D_4$ of the second foil 22121*h* is the thickness of the second foil 22121 before the convex portions 22121*e* and the concave portions 22121*f* are formed by processing.

Exemplarily, the thickness $D_3$ of the first foil 22121*g* may be 0.5 times, 0.6 times, 0.75 times, 0.8 times, 1 times, 1.2 times, 1.5 times, 2 times, etc., the thickness $D_4$ of the second foil 22121*h*.

During experiment, the experiment was performed by selecting a first foil 22121*g* with a thickness of 12 μm, and the experiment was performed in cases where different thicknesses of the second foil 22121*h* were set, so as to measure the influences of the ratio of the thickness of the first foil 22121*g* to the thickness of the second foil 22121*h* in different cases on the mutual welding and assembling of the first foil 22121*g* and the second foil 22121*h*. The experimental results are as follows.

| Thickness $D_3$ of first foil 22121g | Thickness $D_4$ of the second foil 22121h | $D_3/D_4$ | Welding result |
|---|---|---|---|
| 12 μm | 2 μm | 6 | The second foil 22121h being cracked and producing debris |
| 12 μm | 4 μm | 3 | The second foil 22121h being cracked and producing debris |
| 12 μm | 6 μm | 2 | No cracking phenomenon |
| 12 μm | 8 μm | 1.5 | No cracking phenomenon |
| 12 μm | 10 μm | 1.2 | No cracking phenomenon |
| 12 μm | 12 μm | 1 | No cracking phenomenon |
| 12 μm | 16 μm | 0.75 | No cracking phenomenon |
| 12 μm | 20 μm | 0.6 | No cracking phenomenon |
| 12 μm | 24 μm | 05 | No cracking phenomenon |
| 12 μm | 30 μm | 0.4 | The first foil 22121h being cracked and producing debris |

It can be seen from the above experimental data that when the ratio of the thickness $D_3$ of the first foil 22121*g* to the thickness $D_4$ of the second foil 22121*h* is greater than 2, the second foil 22121*h* may have cracking phenomenon during the welding process, thereby producing debris, and cannot meet the requirements of mutual welding and assembling of the first foil 22121*g* and the second foil 22121*h*. When the ratio of the thickness $D_3$ of the first foil 22121*g* to the thickness $D_4$ of the second foil 22121*h* is less than or equal to 2, the first foil 22121*g* and the second foil 22121*h* both do not have cracking phenomenon during the mutual welding process. Therefore, the ratio of the thickness $D_3$ of the first foil 22121*g* to the thickness $D_4$ of the second foil 22121*h* is set to be less than or equal to 2.

Similarly, when the ratio of the thickness $D_3$ of the first foil 22121*g* to the thickness $D_4$ of the second foil 22121*h* is less than 0.5, the first foil $22121g$ may have cracking phenomenon during the welding process, thereby producing debris, and cannot meet the requirements of mutual welding and assembling of the first foil $22121g$ and the second foil $22121h$. When the ratio of the thickness $D_3$ of the first foil $22121g$ to the thickness $D_4$ of the second foil $22121h$ is greater than or equal to 0.5, the first foil $22121g$ and the second foil $22121h$ both do not have cracking phenomenon during the mutual welding process. Therefore, the ratio of the thickness $D_3$ of the first foil $22121g$ to the thickness $D_4$ of the second foil $22121h$ is set to be greater than or equal to 0.5.

The thickness of the first foil $22121g$ is set to be 0.5 to 2 times the thickness of the second foil $22121h$, that is, the thickness of the first foil $22121g$ is 0.5 to 2 times the thickness of the second foil $22121h$, so as to alleviate the phenomenon of too large assembling difficulty of connecting the first foil $22121g$ and the second foil $22121h$ to each other caused by too large difference between the thickness of the first foil $22121g$ and the thickness of the second foil $22121h$, and thereby reduce the difficulty of processing the tab portion $22121$ of this structure. In addition, on the one hand, it can alleviate the phenomenon that the second foil $22121h$ is damaged during the mutual welding process when the thickness of the first foil $22121g$ is too large compared with the thickness of the second foil $22121h$; and on the other hand, it can alleviate the phenomenon that the first foil $22121g$ is damaged during the mutual welding process when the thickness of the second foil $22121h$ is too large compared with the thickness of the first foil $22121g$.

According to some embodiments of the present application, referring to what is shown in FIG. 15 and FIG. 16, in the direction perpendicular to the thickness direction Z of the tab portion, the end of the second foil $22121h$ close to the substrate $22111$ does not extend beyond the end of the first foil $22121g$ connected to the substrate $22111$. It should be noted that when the electrode sheet $221$ is in the unfolded state, in the first direction X, the end of the second foil $22121h$ close to the substrate $22111$ does not extend beyond the end of the first foil $22121g$ connected to the substrate $22111$.

In the above, the end of the second foil $22121h$ close to the substrate $22111$ does not extend beyond the end of the first foil $22121g$ connected to the substrate $22111$, that is, the end of the first foil $22121g$ connected to the substrate $22111$ may be flush with the second foil $22121h$, or may extend out of the second foil $22121h$. Exemplarily, in FIG. 15 and FIG. 16, the end of the first foil $22121g$ connected to the substrate $22111$ extends out from the end of the second foil $22121h$ close to the substrate $22111$.

It should be noted that when the electrode sheet $221$ is in the unfolded state, the end of the second foil $22121h$ close to the substrate $22111$ in the first direction X does not extend beyond the end of the first foil $22121g$ connected to the substrate $22111$ in the first direction X. If the electrode sheet $221$ is wound to form the electrode assembly $22$, and the multiple tab portions $22121$ of the tab are smoothed or flattened and stacked on one end of the electrode assembly $22$, the second foil $22121h$ does not extend out of the end of the first foil $22121g$ connected to the substrate $22111$, in a direction perpendicular to the first direction X and from the end of the first foil $22121g$ away from the substrate $22111$ to the end of the first foil $22121g$ connected to the substrate $22111$.

The second foil $22121h$ is provided not extending beyond the end of the first foil $22121g$ connected to the substrate $22111$ in the direction perpendicular to the thickness direction Z of the tab portion, so as to effectively alleviate the interference effect between the second foil $2212h$ and the active material layer $22112$ provided on one side of the substrate $22111$, thereby reducing the risk of the active material layer $22112$ being damaged by the second foil $22121h$.

According to some embodiments of the present application, continuing to refer to what is shown in FIG. 15 and FIG. 16, in the direction perpendicular to the thickness direction Z of the tab portion, the distance between the end of the first foil $22121g$ away from the substrate $22111$ and the end of the second foil $22121h$ away from the substrate $22111$ is L, satisfying: $L \leq 2$ mm. It should be noted that when the electrode sheet $221$ is in an unfolded state, L is the distance, in the first direction X, between one end of the first foil $22121g$ away from the substrate $22111$ and one end of the second foil $22121h$ away from the substrate $22111$.

In the above, the distance between one end of the first foil $22121g$ away from the substrate $22111$ and one end of the second foil $22121h$ away from the substrate $22111$ is L, that is, one end of the first foil $22121g$ away from the substrate $22111$ and one end of the second foil $22121h$ away from the substrate $22111$ may be flush with each other or staggered with each other. If the end of the first foil $22121g$ away from the substrate $22111$ and the end of the second foil $22121h$ away from the substrate $22111$ are staggered, the spacing between the end of the first foil $22121g$ away from the substrate $22111$ and the end of the second foil $22121h$ away from the substrate $22111$ is less than or equal to 2 mm.

It should be noted that the distance between the end of the first foil $22121g$ away from the substrate $22111$ and the end of the second foil $22121h$ away from the substrate $22111$ is L, and the end of the first foil $22121g$ away from the substrate $22111$ may extend out of the end of the second foil $22121h$ away from the substrate $22111$, and the dimension of the first foil $22121g$ extending beyond the second foil $22121h$ is less than or equal to 2 mm; or the end of the second foil $22121h$ away from the substrate $22111$ extends beyond the end of the first foil $22121g$ away from the substrate $22111$, and the dimension of the second foil $22121h$ extending beyond the first foil $22121g$ is less than or equal to 2 mm. Similarly, L may be 0 mm, 0.2 mm, 0.5 mm, 1 mm, 1.5 mm or 2 mm, etc.

Exemplarily, in FIG. 16, the end of the first foil $22121g$ away from the substrate $22111$ extends beyond the end of the second foil $22121h$ away from the substrate $22111$, and the dimension of the part of the first foil $22121g$ extending beyond the second foil $22121$ is L.

The spacing between the end of the first foil $22121g$ away from the substrate $22111$ and the end of the second foil $22121h$ away from the substrate $22111$ in a direction perpendicular to the thickness direction Z of the tab portion is set to be less than or equal to 2 mm, that is, the dimension of the end of the first foil $22121g$ away from the substrate $22111$ extending beyond the end of the second foil $22121h$ away from the substrate $22111$ is less than or equal to 2 mm, or the dimension of the end of the second foil $22121h$ away from the substrate $22111$ extending beyond the end of the first foil $22121g$ away from the substrate $22111$ is less than or equal to 2 mm, thereby alleviating the phenomenon that the first foil $22121g$ exceeds the second foil $22121h$ too much or the second foil $22121h$ exceeds the first foil too much due to too large length of the first foil $22121g$ or the second foil $22121h$ to cause that the tab portion $22121$ is too long or invertedly inserted into the electrode assembly $22$, thereby facilitating improving the production quality and use reliability of the electrode assembly $22$.

In some embodiments, the first foil 22121*g* and the second foil 22121*h* are of the same material. That is, the first foil 22121*g* and the second foil 22121*h* are both made of the same material.

Exemplarily, the material of the first foil 22121*g* and the material of the second foil 22121*h* may be various, for example, copper, iron, aluminum, steel, aluminum alloy, etc.

The first foil 22121*g* and the second foil 22121*h* are provided to be of the same material, which on the one hand, achieves stable polarity of the tab portion 22121, and on the other hand, reduces the processing difficulty of mutually connecting the first foil 22121*g* and the second foil 22121*h*.

According to some embodiments of the present application, referring to FIG. 5, FIG. 7 and FIG. 8, the electrode sheet 221 may include a body part 2211, a plurality of tab portions 22121 are connected to one end of the body part 2211 in the first direction X, and the body parts 2211 of the two electrode sheets 221 and the separation member 222 are wound in a winding direction Y to form the main body 223. The body part 2211 includes a substrate 22111 and an active material layer provided on at least one side of the substrate 22111, the substrate 22111 includes a coating region 22111*a* and a spacing region 22111*b*, the coating region 22111*a* and the spacing region 22111*b* are arranged in a first direction X, the active material layer 22112 is disposed in the coating region 22111*a*, and the spacing region 22111*b* connects the coating region 22111*a* and the tab portion 22121.

In the above, multiple tab portions 22121 of the tab 2212 are connected to one end of the body part 2211 in the first direction X. When the tab 221 is in an unfolded state, the tab 2212 and the body part 2211 are arranged in the first direction X, and the multiple tab portions 22121 of the tab 2212 are arranged at intervals in the extension direction of the body part 2211; and after the electrode sheet 221 is wound to form the electrode assembly 22, and the tab portion 22121 is bent relative to the first direction X, the multiple tab portions 22121 of the tab 2212 are arranged at intervals in the winding direction Y, and the tab portion 22121 is connected to one end of the body part 2211 in the first direction X, and is arranged at a non-zero angle with the body part 2211.

The active material layer 22112 is provided on at least one side of the substrate 22111, that is, the substrate 22111 may be provided with the active material layer 22112 on only one side, or may be provided with the active material layer 22112 on both sides. Exemplarily, in FIG. 8, two sides of the substrate 22111 are each provided with the active material layer 22112.

The spacing region 22111*b* of the substrate 22111 is the region of the substrate 22111 not coated with the active material layer 22112. The coating region 22111*a* and the spacing region 22111*b* are arranged in the first direction X, and the spacing region 22111*b* connects the coating region 22111*a* and the tab portion 22121, that is, in the first direction X, the spacing region 22111*b* is connected between the coating region 22111*a* and the tab portion 22121. It should be noted that in this embodiment, the tab portion 22121 may be a structure including only one foil 22121*d*, or the tab portion 22121 may also be a structure including a plurality of foils 22121*d* stacked.

In FIG. 8, the spacing region 22111*b* is a blank region on the substrate 22111. It should be noted that in some embodiments, the spacing region 22111*b* on the substrate 22111 that is not coated with the active material layer 22112 may also be coated with an insulating protective layer, etc., to protect the active material layer 22112. Certainly, in other embodiments, the substrate 22111 of the body part 2211 may be not provided with the spacing region 22111*b*, that is, the tab portion 22121 is directly connected to the coating region 22111*a* of the substrate 22111, that is, the active material layer 22112 completely covers one side of the substrate 22111, so that the tab portion 22121*g* is connected to one end of the substrate 22111.

The substrate 22111 is provided with the coating region 22111*a* coated with an active material layer 22112 and the spacing region 22111*b* not coated with an active material layer 22112, so that the tab portion 22121 may be connected to the coating region 22111*a* through the spacing region 22111*b* to achieve that the tab portion 22121 and the active material layer 22112 are spacedly provided in the first direction X. On the one hand, the electrode assembly 22 adopting this structure can isolate through the spacing region 22111*b* the stress generated during the bending process of the tab portion 22121 relative to the first direction X, so as to reduce the risk of occurrence of fracture of the active material layer 22112 provided on the coating region 22111*a*. On the other hand, in the subsequent process of welding the tab 2212 to other components, the influence on the active material layer 22112 during welding process can be reduced, thereby alleviating the phenomenon of damage to the active material layer 22112 and further facilitating improving the production quality of the electrode assembly 22.

In some embodiments, referring to what is shown in FIG. 5, the tab portion 22121 is integrally formed with the spacing region 22111*b*.

In the above, the tab portion 22121 and the spacing region 22111*b* are integrally formed, that is, the tab portion 22121 only includes one foil 22121*d*, and the tab portion 22121 is a structure formed on the substrate 22111 by cutting and processing. Certainly, in other embodiments, the tab portion 22121 and the substrate 22111 may also be of a split structure. For example, the tab portion 22121 is connected to one end of the substrate 22111 in the first direction X by means of welding or the like.

It should be noted that in the embodiment where the spacing region 22111*b* is not provided on the substrate 22111 of the body part 2211, the tab portion 22121 may also be a structure integrally formed with the substrate 22111, that is, the tab portion 22121 is integrally formed with the coating region 22111*a* of the substrate 22111.

The tab portion 22121 is provided as a structure integrally formed with the spacing region 22111*b* of the substrate 22111, enabling the tab portion 22121 to be a part of the substrate 22111 in the actual production process, such that after reserving a region on the substrate 22111 where the active material layer is not provided, the tab portion 22121 may be provided on the region to reduce the processing difficulty of connecting the tab portion 22121 to the substrate 22111 and facilitate improving the production efficiency of the electrode assembly 22.

According to some embodiments of the present application, referring to what is shown in FIG. 5 and FIG. 8, in the thickness direction Z of the tab portion, grooves are formed on one side of the tab portion 22121 away from the protrusions 22121*a* and at positions corresponding to the protrusions 22121*a*.

In the above, in the thickness direction Z of the tab portion, grooves 22121*b* are formed on the side of the tab portion 22121 away from the protrusions 22121*a* and at positions corresponding to the protrusions 22121*a*. That is, protrusions 22121*a* are formed on one side of the tab portion 22121, and grooves 22121*b* are formed on the other side at the positions corresponding to the protrusions 22121*a*, so that the protrusions 22121*a* and the grooves 22121*b* are arranged in a one-to-one correspondence in the thickness direction Z of the tab portion.

Exemplarily, the tab portion 22121 of this structure may be processed in various ways, such as stamping or rolling.

Grooves 22121*b* are provided on the side of the tab portion 22121 away from the protrusions 22121*a* and at the positions corresponding to the protrusions 22121*a*, so that for the tab portion 22121 of this structure, it is realized that the protrusions 22121*a* are formed on the tab portion 22121 by a process such as stamping or rolling, which on the one hand, facilitates reducing the processing difficulty of the tab portion 22121 and improving the processing efficiency of the tab portion 22121, and on the other hand, has no need to provide protrusions 22121*a* on one side of the tab portion 22121 by adding materials, facilitates reducing the production cost of the tab portion 22121 and reducing the weight of the tab portion 22121.

Figure 17:
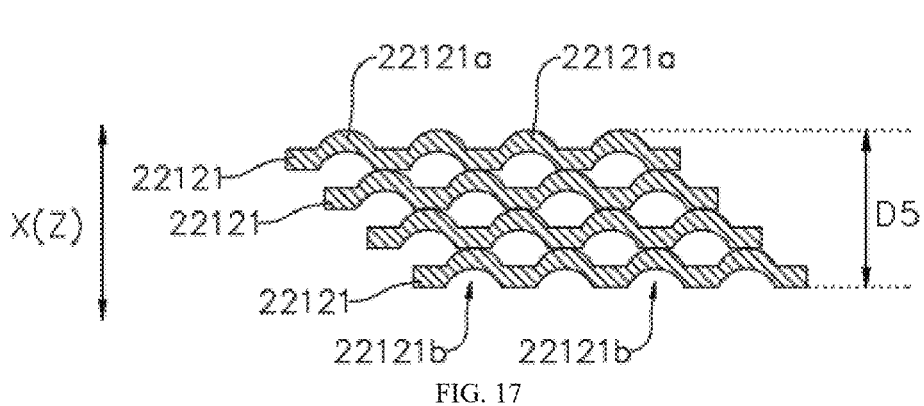
FIG. 17 is a sectional view of a plurality of stacked tab portions of a tab of an electrode assembly provided by some embodiments of the present application.

According to some embodiments of the present application, referring to FIG. 5 and FIG. 8, and further referring to FIG. 17, FIG. 17 is a sectional view of a plurality of stacked tab portions 22121 of a tab 2212 of an electrode assembly 22 provided by some embodiments of the present application. In the first direction X, in two adjacent tab portions 22121, the protrusions of one tab portion 22121 are staggered with the grooves 22121*b* of the other tab portion 22121.

In the above, in two adjacent tab portions 22121, the protrusions 22121*a* of one tab portion 22121 and the grooves 22121*b* of the other tab portion 22121 are staggered, that is, in two adjacent tab portions 22121, the protrusions 22121*a* of one tab portion 22121 and the grooves 22121*b* of the other tab portion 22121 are not aligned in the first direction X.

In two adjacent tab portions 22121 in the first direction X, the protrusions 22121*a* of one tab portion 22121 and the grooves 22121*b* of the other tab portion 22121 are provided as structures staggered with each other, so as to effectively alleviate the phenomenon that the protrusions 22121*a* and the groove 22121*b* overlap and offset each other, to make the tab 2212 have sufficient thickness in the first direction X, and further facilitate reducing the risk of the tab 2212 of the electrode assembly 22 being welded through during the subsequent assembly.

In some embodiments, referring to what is shown in FIG. 17, in the first direction X, the thickness of the tab 2212 is $D_5$, satisfying 0.2 mm$\leq D_5 \leq$2.5 mm.

In the above, the thickness of the tab 2212 is $D_5$, that is, after the multiple tab portions 22121 of the tab 2212 are bent relative to the first direction X by process of smoothing or flattening, etc. and stacked on one end of the main body 223 of the electrode assembly 22 in the first direction X, and the dimension of the tab 2212 in the first direction X is $D_5$.

Exemplarily, the thickness $D_5$ of the tab 2212 may be 0.2 mm, 0.3 mm, 0.4 mm, 0.5 mm, 0.8 mm, 1 mm, 1.5 mm or, 2 mm or 2.5 mm, etc.

By setting the thickness of the tab 2212 in the first direction X to be 0.2 mm to 2.5 mm, on the one hand, the risk of the tab 2212 being welded through due to the too small thickness of the tab 2212 can be alleviated, so as to reduce the risk of damage to the electrode assembly 22 during subsequent assembly. On the other hand, the phenomenon of the tab 2212 occupying too much space due to the too large thickness of the tab 2212 can be alleviated, which is conductive to optimizing the internal space of the battery cell 20 having such electrode assembly 22 to improve the energy density of the battery cell 20.

According to some embodiments of the present application, referring to FIG. 4, FIG. 5 and FIG. 6, in the first direction Y, two tabs 2212 are provided on two ends of the main body 223 of the electrode assembly 22, respectively.

In the above, the two electrode sheets 221 has opposite polarities, that is, the two electrode sheets 221 are respectively the positive electrode sheet and the negative electrode sheet of the electrode assembly 22.

The two tabs 2212 are respectively provided at the two ends of the main body 223 of the electrode assembly 22, that is, the tabs 2212 of the two electrode sheets 221 with opposite polarities are respectively formed at the two ends of the electrode assembly 22 in the first direction X, so that the positive tab and the negative tab are respectively formed at the two ends of the electrode assembly 22 in the first direction X to output or input the positive electrode and negative electrode of the electrode assembly 22.

The two tabs 2212 of the electrode assembly 22 are provided respectively at the two ends of the main body 223 of the electrode assembly 22 in the first direction X, so that the two tabs 2212 are respectively formed at the two ends of the electrode assembly 22 in the first direction X, so as to facilitate subsequent assembly of the electrode assembly 22, which is conductive to reducing the difficulty of assembling the battery cell 20 having such electrode assembly 22 and can reduce the interference or mutual contact between the two tabs 2212 and thereby facilitate reducing the risk of short circuit of the electrode assembly 22.

In some embodiments, referring to what is shown in FIG. 3, FIG. 4 and FIG. 5, the main body 223 of the electrode assembly 22 is cylindrical. Certainly, the structure of the main body 223 of the electrode assembly 22 is not limited thereto. In other embodiments, the main body 223 of the electrode assembly 22 may also be a columnar structure with an elliptical cross section.

The electrode assembly 22 is provided as a cylindrical structure, so as to facilitate subsequent processing to form a battery cell 20 of a cylindrical structure.

According to some embodiments of the present application, referring to what is shown in FIG. 3, embodiments of the present application further provide a battery cell 20, including a shell 21 and the electrode assembly 22 of any solution above, where the electrode assembly 22 is accommodated in the shell 21.

In the above, the shell 21 may include a casing 211 and an end cover 212, the casing 211 is in a hollow structure with an opening 2111 at one side, and the end cover 212 seals the opening 2111 of the casing 211 to form a sealed space for accommodating the electrode assembly 22.

The casing 211 may be in various shapes, such as a cylinder, a cuboid and so on. The shape of the casing 211 may be determined by the specific shape of the electrode assembly 22. Exemplarily, in FIG. 3, the electrode assembly 22 is cylindrical, and correspondingly, may be in a cylinder structure.

In some embodiments, the shell 21 may further include a positive electrode terminal and a negative electrode terminal, the positive electrode terminal being mounted on the end cover 212, and the negative electrode terminal being mounted on the end of the casing 211 opposite to the end cover 212. Certainly, in other embodiments, the positive electrode terminal may be installed on the end of the casing 211 opposite to the end cover 212, and the negative electrode terminal may be installed on the end cover 212.

In the above, the positive electrode terminal and the negative electrode terminal are respectively used to be electrically connected to the tabs 2212 at two ends of the electrode assembly 22 in the first direction X, so as to serve to output or input electric energy for the battery cell 20.

Exemplarily, the positive electrode terminal and the negative electrode terminal may be made of a variety of materials, such as copper, iron, aluminum, steel or aluminum alloy.

The positive electrode terminal and the negative electrode terminal may be directly connected to the tabs 2212 of the electrode assembly 22, for example, by welding or abutting. The positive electrode terminal and the negative electrode terminal may be indirectly connected to tabs 2212 of the electrode assembly 22, for example, the positive electrode terminal and the negative electrode terminal abut against or is welded to the electrode assembly 22 through other components.

According to some embodiments of the present application, continuing to refer to what is shown in FIG. 3, the battery cell 20 further includes current collecting members 23, the current collecting members 23 are provided between the shell 21 and tabs 2212 in the first direction X, and the current collecting members 23 connect the shell 21 and the tabs 2212.

In the above, the current collecting member 23 serves to connect the tab 2212 of the electrode assembly 22 and the positive electrode terminal or the negative electrode terminal, to achieve electrical connection between the electrode assembly 22 and the positive electrode terminal or the negative electrode terminal. The current collecting member 23 may be made of various materials, such as copper, iron, aluminum, steel or aluminum alloy.

Exemplarily, in FIG. 3, the battery cell 20 includes two current collecting members 23. The two current collecting members 23 are respectively arranged at two ends of the electrode assembly 22 in the first direction X, one current collecting member 23 connecting the positive electrode terminal and one tab 2212 of the electrode assembly 22, and the other current collecting member 23 connecting the negative electrode terminal and the other tab 2212 of the electrode assembly 22, so as to realize inputting or outputting of electric energy for the battery cell 20.

Optionally, the current collecting member 23 and the tab 2212 may be connected in various ways, such as welding, bonding or abutting. Exemplarily, in the embodiment of the present application, the current collecting member 23 and the tab 2212 are connected by welding.

By providing current collecting members 23 in the shell 21 of the battery cell 20, the shell 21 is connected to the tabs 2212 of the electrode assembly 22 through the current collecting members 23, so as to achieve inputting or outputting of the electric energy for the battery cell 20. This structure is simple, easy to implement, and is conducive to reducing the difficulty of assembling the tabs 2212 and the shell 21.

Figure 18:
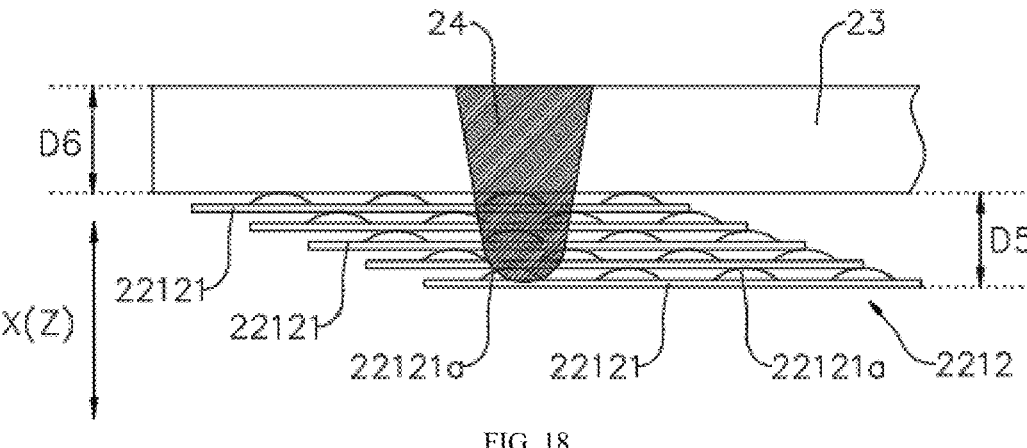
FIG. 18 is a schematic view showing connection between a current collecting member and a tab of an electrode assembly provided by some embodiments of the present application.

According to some embodiments of the present application, referring to FIG. 3, and further referring to FIG. 18, FIG. 18 is a schematic view showing connection between a current collecting member 23 and a tab 2212 of an electrode assembly 22 provided by some embodiments of the present application. The current collecting member 23 is connected to the tab 2212 by welding, and in the first direction X, the thickness of the tab 2212 is $D_5$, and the thickness of the current collecting member 23 is $D_6$, satisfying: $D_6 \leq 1.5 D_5$.

In the above, the current collecting member 23 is disposed at one end of the electrode assembly 22 in the first direction X, so that the current collecting member 23 may be welded to the electrode tab 2212 at one end of the electrode assembly 22 in the first direction X.

In the first direction X, the thickness of the tab 2212 is $D_5$, that is, after the multiple tab portions 22121 of the tab 2212 are bent relative to the first direction X by the process of smoothing or flattening, etc. and stacked on one end of the main body 223 of the electrode assembly 22 in the first direction X, the dimension of the tab 2212 in the first direction X is $D_5$.

In the first direction X, the thickness of the current collecting member 23 is $D_6$, that is, the dimension of the current collecting member 23 in the first direction X is $D_6$.

$D_6 \leq 1.5 D_5$, that is, the thickness of the current collecting member 23 is less than or equal to 1.5 times the thickness of the tab 2212. Exemplarily, the thickness De of the current collecting member 23 may be 1.5 times, 1.4 times, 1.2 times, 1.25 times, 1 times, 0.9 times, 0.8 times, 0.75 times, 0.5 times, etc., the thickness $D_5$ of the tab 2212.

During experiment, the experiment was performed in cases where different thicknesses of the current collecting member 23 and different thicknesses of the tab 2212 were set, so that different ratios of the thickness of the current collecting member 23 to the thickness of the tab 2212 were used for experiment, so as to measure the influences of the ratio of the thickness of the current collecting member 23 to the thickness of the tab 2212 in different cases on the current. The experimental results are as follows.

| Thickness $D_6$ of current collecting member 23 | Thickness $D_5$ of tab 2212 | $D_6/D_5$ | Weld-through ratio |
|---|---|---|---|
| 0.8 mm | 0.2 mm | 4 | 100% welding through |
| 0.6 mm | 0.2 mm | 3 | 100% welding through |
| 0.75 mm | 0.3 mm | 2.5 | 55% welding through |
| 0.6 mm | 0.3 mm | 2 | 20% welding through |
| 0.6 mm | 0.4 mm | 1.5 | 0% welding through |
| 0.5 mm | 0.4 mm | 1.25 | 0% welding through |
| 0.4 mm | 0.4 mm | 1 | 0% welding through |
| 0.3 mm | 0.4 mm | 0.75 | 0% welding through |

It can be seen from the above experimental data that when the ratio of the thickness of the current collecting member 23 to the thickness of the tab 2212 is greater than 1.5, the tab 2212 has the phenomenon of being welded through, resulting in poor assembly quality of the current collecting member 23 and the tab 2212, which cannot meet the assembly requirements. When the ratio of the thickness of the current collecting member 23 to the thickness of the tab 2212 is less than or equal to 1.5, the phenomenon of the tab 2212 being welded through can be alleviated, which is conducive to improving the assembly quality of the current collecting component 23 and the tab 2212. Therefore, the ratio of the thickness of the current collecting member 23 to the thickness of the tab 2212 is set to be less than or equal to 1.5, that is, $D_6 \leq 1.5 D_5$.

The thickness of the current collecting member 23 in the first direction X is set to be less than or equal to 1.5 times the thickness of the tab 2212 in the first direction X, so as to alleviate the phenomenon that the welding power required for welding the current collecting member 23 and the tab 2212 is too large due to that the thickness of the current collecting member 23 is too large compared with the thickness of the tab 2212, thereby effectively reducing the risk of the tab 2212 being welded through to reduce the phenomenon of damage to the electrode assembly 22 and facilitating improving the production quality of battery cells 20.

In some embodiments, referring to what is shown in FIG. 18, the current collecting member 23 is connected to the tab 2212 by welding and weld mark(s) 24 is formed, and in the first direction X, the weld mark 24 covers the protrusion(s) 22121a of at least one of the tab portions 22121.

In the above, in the first direction X, the weld mark 24 covers the protrusion(s) 22121*a* of at least one of the tab portions 22121, that is, in the first direction X, the position where the current collecting member 23 and the tab 2212 are welded to each other is arranged corresponding to the protrusion 22121*a* of at least one tab portion 22121.

The weld mark 24 formed by welding the current collecting member 23 and the tab 2212 to each other is provided to cover the protrusion(s) 22121*a* of at least one tab portion 22121 in the first direction X, so as to make the position where the current collecting member 23 and the tab 2212 are welded to each other is located in the region where the tab 2212 is thickened by the protrusion 22121*a*, which is conductive to further reducing the risk of the tab 2212 being welded through during the assembly process.

According to some embodiments of the present application, embodiments of the present application further provide a battery 100, which battery 100 includes at least one battery cell 20 of any solution above.

In the above, the battery 100 may include a box 10, and the at least one battery cell 20 is accommodated in the box 10.

Optionally, there may be one or more battery cells 20 accommodated in the box 10. Exemplarily, in FIG. 2, the battery 100 includes a plurality of battery cells 20, and the plurality of battery cells 20 are all accommodated in the box 10. The plurality of battery cells 20 may be in serial, parallel or hybrid connection with each other. The hybrid connection means that the plurality of battery cells 20 are connected with each other both in series and in parallel. The multiple battery cells 20 may be in serial, parallel or hybrid connection with each other, and then the whole composed of the multiple battery cells 20 is accommodated in the box 10.

According to some embodiments of the present application, embodiments of the present application further provide an electric device, including at least one battery 100 of any solution above, where the battery 100 is used to provide electric energy for the electric device.

The electric device may be any of the aforementioned devices or systems using the battery 100.

According to some embodiments of the present application, referring to what is shown in FIG. 4 to FIG. 10, the present application provides an electrode assembly 22, the electrode assembly 22 being of a wound structure. The electrode assembly 22 includes two electrode sheets 221 with opposite polarities and a separation member 222 for isolating the two electrode sheets 221. The two electrode sheets 221 and the separation member 222 are wound in a winding direction Y to form a main body 223 and two tabs 2212, and the tabs 2212 of the two electrode sheets 221 are provided at two ends of the main body 223 in the first direction X, respectively. The electrode sheet 221 includes a body part 2211 and a tab 2212. The extension direction of the body part 2211 is consistent with the winding direction Y. The body part 2211 includes a substrate 22111 and an active material layer 22112 provided on two sides of the substrate 22111, the substrate 22111 includes a coating region 22111*a* and a spacing region 22111*b*, the coating region 22111*a* and the spacing region 22111*b* are arranged in a first direction X, the active material layer 22112 is coated on the coating region 22111*a*. The tab 2212 includes a plurality of tab portions 22121, the tab portion 22121 is connected to one end of the spacing region 22111*b* away from the coating region 22111*a* in the first direction X, and the plurality of tab portions 22121 are arranged at intervals in the winding direction Y, and at least some of the plurality of tab portions 22121 are stacked in the first direction X to form the tab 2212 at one end of the electrode assembly 22 in the first direction X. The thickness of the tab 2212 in the first direction X is $D_5$, satisfying $0.2\ mm \leq D_5 \leq 2.5\ mm$. In the thickness direction Z of the tab portion, a plurality of protrusions 22121*a* are formed on one side of the tab portion 22121, and grooves 22121*b* are formed on the side of the tab portion 22121 away from the protrusions 22121*a* and at positions corresponding to the protrusions 22121*a*. In the first direction X, in two adjacent tab portions 22121, the protrusions 22121*a* of one tab portion 22121 are staggered with the grooves 22121*b* of the other tab portion 22121. In the thickness direction Z of the tab portion, the projection area of the tab portion 22121 is $S_1$, and the sum of the projection areas of the multiple protrusions 22121*a* on the tab portion 22121 is $S_2$, satisfying $S_2/S_1 \geq 0.5$. The tab portion 22121 includes a main body region 22121*c* that does not overlap with the projections of the protrusions 22121*a* in the thickness direction Z of the tab portion. In the thickness direction Z of the tab portion, the maximum dimension of the tab portion 22121 is $D_1$, and the thickness of the main body region 22121*c* is $D_2$, satisfying $2 \leq D_1/D_2 \leq 8$. In the above, the protrusion 22121*a* is a hemispherical structure, and the multiple protrusions 22121*a* include multiple rows of protrusions 22121*a* arranged at intervals. Each row of protrusions 22121*a* include multiple protrusions 22121*a* arranged at intervals. The diameter of the protrusion 22121*a* in the direction perpendicular to the thickness direction Z of the tab portion is $W_1$, satisfying $0.3\ mm \leq W_1 \leq 2\ mm$.

According to some embodiments of the present application, referring to what is shown in FIG. 3 and FIG. 18, the present application provides a battery cell 20. The battery cell 20 includes a shell 21, an electrode assembly 22, and current collecting members 23. The electrode assembly 22 is accommodated in the shell 21. In the first direction X, the current collecting members 23 are provided between the shell 21 and the tabs 2212, and the current collecting members 23 connect the shell 21 and the tabs 2212. The current collecting member 23 is connected to the tab 2212 by welding and weld mark(s) 24 is formed, and in the first direction X, the weld mark 24 covers the protrusion(s) 22121*a* of at least one tab portion 22121. In the above, in the first direction X, the thickness of the tab 2212 is $D_5$, and the thickness of the current collecting member 23 is $D_6$, satisfying: $D_6 \leq 1.5 D_5$.

It should be noted that without conflict, the embodiments and the features of the embodiments in the present application may be combined with each other.

The above are only preferred embodiments of the present application and are not intended to limit the present application. For those skilled in the art, the present application may have various modifications and variations. Any modifications, equivalent replacements, improvements, etc. made within the spirit and principles of the present application shall be included in the protection scope of the present application.

What we claim is:

1. An electrode assembly, comprising:
   two electrode sheets with opposite polarities and a separator configured for isolating the two electrode sheets, wherein the two electrode sheets and the separator are wound in a winding direction to form a main body and two tabs,
   wherein the tabs and the main body are provided in a first direction, the tabs each comprises a plurality of tab portions provided at intervals in the winding direction, the tab portions are each bent relative to the first direction, at least some of the plurality of tab portions are stacked in the first direction, and at least one protrusion is provided on at least one side of each of the tab portions in a thickness direction thereof, wherein each of the two electrode sheets includes a body part, with the plurality of tab portions connected to one end of the body part in the first direction, the body part of the each of the two electrode sheets and the separator are wound in the winding direction to form the main body, each of the two electrode sheets includes a substrate and an active material layer disposed on at least one side of the substrate, the substrate includes a coating region and a spacing region, the coating region and the spacing region being arranged along the first direction, the active material layer is disposed in the coating region, and the spacing region connects the coating region and one of the tab portions, and the at least one protrusion of each of the tab portions is spaced apart from the body part of the each of the two electrode sheets along the first direction, wherein in the thickness direction of the tab portion, the tab portion comprises a plurality of foils stacked, each of the foils has one side provided with at least one convex portion and the other side provided with at least one concave portion at least one position corresponding to the at least one convex portion, and in two adjacent foils, at least one convex portion of one foil is accommodated in at least one concave portion of the other foil, and wherein in the thickness direction of the tab portion, the at least one convex portion located on one side of the tab portion is the at least one protrusion.

2. The electrode assembly according to claim 1, wherein in the thickness direction of the tab portion, a plurality of protrusions are formed on at least one side of the tab portion.

3. The electrode assembly according to claim 1, wherein the tab portion is provided with a plurality of rows of protrusions, and each row of protrusions include a plurality of the protrusions provided at intervals.

4. The electrode assembly according to claim 3, wherein a maximum dimension of each of the protrusions in a direction perpendicular to the thickness direction of the tab portion is $W_1$, satisfying 0.3 mm≤$W_1$≤2 mm.

5. The electrode assembly according to claim 1, wherein the tab portion is provided with a plurality of protrusions arranged at intervals, and two ends of each of the protrusions extend in a direction perpendicular to an arrangement direction of the plurality of protrusions, to two ends of the tab portion respectively.

6. The electrode assembly according to claim 1, wherein the plurality of foils are connected by welding to form convex portions and concave portions on the foils.

7. The electrode assembly according to claim 1, wherein the plurality of foils comprise a first foil and a second foil which are stacked, the first foil is connected to one end of the substrate in the first direction and is integrally formed with the substrate, and the second foil is provided separated from the substrate.

8. The electrode assembly according to claim 7, wherein in a direction perpendicular to the thickness direction of the tab portion, one end of the second foil close to the substrate does not extend beyond one end of the first foil connected to the substrate.

9. The electrode assembly according to claim 7, wherein in a direction perpendicular to the thickness direction of the tab portion, a distance between one end of the first foil away from the substrate and one end of the second foil away from the substrate close to the substrate is L, satisfying L≤2 mm.

10. The electrode assembly according to claim 7, wherein the first foil and the second foil are made of a same material.

11. The electrode assembly according to claim 1, wherein the tab portion is integrally formed with the spacing region.

12. The electrode assembly according to claim 1, wherein in the thickness direction of the tab portion, at least one groove is formed on one side of the tab portion away from the at least one protrusion and at least one position corresponding to the at least one protrusion.

13. The electrode assembly according to claim 12, wherein in the first direction, in two adjacent tab portions, the at least one protrusion of one tab portion is staggered with the at least one groove of the other tab portion.

14. The electrode assembly according to claim 1, wherein in the first direction, two tabs are provided at two ends of the main body respectively.

15. The electrode assembly according to claim 1, wherein the main body is in a cylinder shape.

16. A battery cell, comprising:
a shell; and
the electrode assembly according to claim 1, the electrode assembly being accommodated in the shell.

17. The battery cell according to claim 16, wherein the battery cell further comprises:
current collectors, provided between the shell and tabs in the first direction, wherein the current collectors are connected to the shell and the tabs.

18. The battery cell according to claim 17, wherein the current collectors are connected to the tabs by welding and weld marks are formed, and in the first direction, each of the weld marks covers the at least one protrusion of at least one of the tab portions.

19. A battery, comprising at least one battery cell each according to claim 16.

* * * * *